United States Patent [19]
Lipe et al.

[11] Patent Number: 5,784,615
[45] Date of Patent: Jul. 21, 1998

[54] COMPUTER SYSTEM MESSAGING ARCHITECTURE

[75] Inventors: Ralph Allen Lipe, Woodinville; Raymond J. Chen, Bellevue; Michael A. Schmidt; Sankar Ramasubramanian, both of Redmond, all of Wash.

[73] Assignee: Microsoft Corporation, Redmond, Wash.

[21] Appl. No.: 355,044

[22] Filed: Dec. 13, 1994

[51] Int. Cl.⁶ .................................................. G06F 9/40
[52] U.S. Cl. ................................................... 395/681
[58] Field of Search ................. 395/700, 680, 395/681, 682

[56] References Cited

U.S. PATENT DOCUMENTS

| | | | |
|---|---|---|---|
| 3,916,385 | 10/1975 | Parmar et al. | 340/436 |
| 4,177,510 | 12/1979 | Appell et al. | 395/490 |
| 5,305,461 | 4/1994 | Feigenbaum et al. | 395/566 |
| 5,414,848 | 5/1995 | Sandage et al. | 395/677 |
| 5,522,075 | 5/1996 | Robinson et al. | 395/406 A |
| 5,530,858 | 6/1996 | Stanley et al. | 395/677 |
| 5,537,597 | 7/1996 | Sandage | 395/712 |

OTHER PUBLICATIONS

Ruediger R. Asche, "What'New in Windows 95 for VxD Writers?", Microsoft Developers Data Network CD-ROM, pp. 1-12, Apr. 1994.

Ruediger R. Asche, "The Little Device Driver" Microsoft Developers Data Network CD-ROM, pp. 1-25, Feb. 1994.

"Windows API Bible—The Definitive Programmer's Reference," James L. Conger, The Waite Group, Inc., 1992, pp. Title, Table of Contents, Chapters 8 and 9 (pp. 216-349).

"Ringo: VxDs on the Fly," Alex Schmidt, Introduction by Andrew Schulman, Dr. Dobb's Journal, Mar. 1994, pp. 133-139; 150.

*Primary Examiner*—Kevin A. Kriess
*Assistant Examiner*—St. John Courtenay, III
*Attorney, Agent, or Firm*—Klarquist Sparkman Campbell Leigh & Whinston, LLP

[57] ABSTRACT

An operating system for a computer system having a protection scheme with a plurality of privilege rings provides services for message broadcasting from applications at less privileged rings to virtual drivers at a most privileged ring, and from the virtual drivers to applications. The virtual drivers can perform user mode operations including message broadcasting as an application by synchronizing to a thread of a user mode message server at application time, and setting the thread's user mode context to perform the operations.

18 Claims, 7 Drawing Sheets

COMPUTER SYSTEM MESSAGING ARCHITECTURE

FIELD OF THE INVENTION

This invention relates to the communication of messages between various computer operating system components and applications, and more particularly relates to message broadcasting between various operating system components and applications executing at different privilege rings on a protected mode computer system.

BACKGROUND OF THE INVENTION

Many computer systems, including personal computers (PCs) which utilize the Intel 80386, 80486, or Pentium microprocessor (the "Intel protected mode microprocessors"), protect against errant application program behavior (e.g. garbling of critical operating system data structures) by providing a plurality of privilege levels in a protected mode of operation. The privilege level allocated to a particular program restricts which data the program can access and which code it can execute. In the protection scheme for the Intel protected mode microprocessors for example, programs can be allocated to any of four privilege levels known as rings 0 through 3 (in order of decreasing privilege). (The term "ring" derives from the representation of these privilege levels with a diagram shown in FIG. 1 which depicts the privilege levels as concentric rings.) In general, programs are restricted by the processor from accessing data in more privileged rings and from executing code in less privileged rings. The processor performs protection checks for each access to new data, or call to new code, and issues a general protection fault if the protection scheme is violated.

To prevent errant application program behavior, core operating system components generally are allocated to ring 0 (which is most privileged), while application programs ("applications") are allocated to less privileged rings (e.g. any of rings 1–3 on the Intel protected mode microprocessors). (For expository convenience, the term "user mode" is used herein to refer to applications and other software components allocated to lesser privileged rings, such as rings 1–3 of the Intel protected mode microprocessors. The term ring 0 is used to refer to operating system and other components at the most privileged level of a protection scheme of a processor, whether or not the components are adapted to the Intel protected mode microprocessors.) Accordingly, only ring 0 operating system components have general access to data on the computer system (including critical operating system data structures, such as file system tables). Meanwhile, applications and other user mode software components are restricted by the processor from accessing data outside a limited memory space.

Additionally, the processor's privilege checking generally prevents ring 0 operating system components from executing less privileged, user mode code (which may be less reliable and lead to unintended or unpredictable behavior). The protection scheme allows applications to execute more privileged code, such as through use of a call gate. The call gate mechanism, however, limits applications to entering more privileged code only at predefined entry points set by the operating system. Applications can thereby invoke operating system services provided by a ring 0 operating system component by issuing a call instruction which references a preset call gate, while still being prevented from haphazardly entering the middle of a protected mode operating system function. Transitions between code executing at different rings also can occur as a result of a task switch, interrupt or trap. Such transitions between rings are generally costly in terms of processing time since the current stack and/or task states must be saved. On the Intel 486 microprocessor, for example, a direct subroutine call to code in another segment in the same ring takes 20 clock cycles. If a ring transition also is involved then 69 clock cycles are consumed. Returns from a call with a ring transition also are more costly.

In some operating systems, various hardware devices (e.g. peripheral devices) of a computer system are controlled by software components which are referred to as device drivers. Such device drivers generally are written to control a specific hardware device, such as a particular manufacturer's mouse pointing device, printer, modem, hard disk, etc. Device drivers also may be written to control a general class of device and operate with the devices of several manufacturers. Some device drivers may be included in an operating system. Others may be provided separately by the device's manufacturer. In many operating systems, device drivers typically are installed at less privileged rings as user mode components. In some operating systems, however, it may be advantageous to install device drivers at the most privileged ring, e.g. ring 0 of Intel protected mode microprocessors. Calls between the device driver and core operating system components installed at ring 0 can then be made without costly ring transitions. The device driver also has easier access to operating system data structures. Additionally, the device driver can more easily intercept direct accesses by applications and other software components to the controlled device, such as with a trap mechanism, to facilitate sharing of the device among plural applications.

The placement of device drivers at a more privileged level than that of applications has drawbacks in that interaction between the device drivers and applications is made more difficult. As noted above, device drivers normally are not able to directly call and execute code at less privileged rings. Device drivers therefore generally cannot execute an application's functions. In some situations, however, it is desirable for a ring 0 device driver to communicate information generated by the driver to applications needing to act upon the information. For example, a ring 0 device driver for a floppy disk drive may be directly notified via a hardware interrupt when the floppy disk is ejected. At the time of ejection, any number of applications may have a file open on the floppy disk. Unless these applications can be made aware of the ejection, the applications may attempt to erroneously access the floppy disk. Other examples of such situations in which communication between ring 0 drivers and applications is needed include dynamically installing a hardware device (such as a PCMCIA standard SCSI interface card) and associated drivers, or attempting a system shut-down before an application's data is saved.

Some prior computer operating systems, particularly those having event-driven, multi-tasking windowing environments, provide message services by which application programs are notified of hardware events and other changes in the system's state. In previous versions of Microsoft Corporation's Windows operating system for example, a message queue is provided for storing messages to application programs. The operating system posts messages to the message queue to inform an application of hardware events (e.g. a key press on a keyboard, a mouse pointing device's button click or movement) and system state changes (e.g. system shutdown or exception). Applications also can post messages to each other in the message queue by invoking an application programming interface ("API") entitled "PostMessage( )." (An application programming interface is an operating system service or function which can be called by applications. While the term API properly refers to an entire body of functions provided by an operating system or component thereof, the term in common usage, and as used herein, refers also to a single function provided therein.) For processing the messages, Windows applications typically have an instruction loop in a "WinMain( )" function which includes calls to a "GetMessage( )" API for retrieving messages from the application's queue, and to a "DispatchMessage( )" API which sends the message to the application's "WndProc( )" function for processing. The application's WndProc( ) function contains code which performs operations responsive to the messages. Applications also can communicate a message directly to another application's WndProc( ) function (bypassing the message queue) using a "SendMessage( )" API. These messaging features of previous Windows versions are illustrated in FIG. 2.

The message services of previous versions of Microsoft Corporation's Windows operating system, however, have not provided the capability for a ring 0 device driver or other ring 0 operating system component to communicate messages generally to the applications running on the system. Additionally, no capability has been provided for applications to communicate messages generally to ring 0 device drivers. A need therefore exists for a way to broadcast system related messages generally between ring 0 device drivers and applications.

Further, while core operating system components in some operating systems are allocated at ring 0, other operating system components may be allocated at less privileged rings. Because of the processor enforced protection scheme, services provided by such operating system components at less privileged rings generally can not be accessed by ring 0 operating system components. For example, in previous Microsoft Corporation's Windows versions, user interface services are generally provided by user mode operating system components. Because such user interface services were unavailable to ring 0 operating system components, the ring 0 operating system component in Windows version 3.1 that responds to a user's "Ctrl+Alt+Del", key presses to close a non-responding application could only display a character mode blue screen rather than the more typical dialog box available through the user interface services of that operating system. A need therefore exists in some situations for a ring 0 driver or operating system component to operate as a user mode application despite any processor-enforced protection.

Accordingly, an object of the invention is to provide a messaging service for a ring 0 operating system component to broadcast a system related message to applications.

A further object of the invention is to provide a messaging service for applications to broadcast system related messages to ring 0 operating system components.

Yet another object of the invention is to provide a way for ring 0 drivers and operating system components to perform operations, including access to operating system services, as if it were a user mode application.

SUMMARY OF THE INVENTION

The present invention provides a computer operating system and method by which ring 0 components can broadcast messages to user mode applications, and user mode applications can broadcast messages to ring 0 components. The present invention further provides a computer operating system and method by which ring 0 drivers and other operating system components can perform operations as a user mode application.

According to one preferred embodiment of the invention, an operating system comprises a ring 0 operating system component having a number of messaging service APIs callable by ring 0 drivers. Through these APIs, the ring 0 drivers can access messaging services to initiate broadcasts to user mode applications and to receive broadcasts from user mode applications. More particularly, the ring 0 operating system component has a broadcast system message API and a hook system broadcast API. Ring 0 drivers initiate broadcasts to user mode applications by calling the broadcast system message API of the ring 0 operating system component. Ring 0 drivers can set a flag in the call to selectively broadcast to various sets of components. With a call to the hook system broadcast API, a ring 0 driver registers a hook function with the ring 0 operating system component. During any subsequent broadcasts to ring 0 drivers, the ring 0 operating system component calls these hook functions to notify the ring 0 drivers which registered the functions of the broadcast.

The operating system in the preferred embodiment also comprises a user mode operating system component having messaging service APIs callable by user mode applications. More particularly, the user mode operating system component also has a broadcast system message API. A user mode application initiates broadcasts to other user mode applications and ring 0 drivers by calling the broadcast system message API of the user mode operating system component. User mode applications can set a flag in the call to selectively broadcast to various sets of components. User mode applications can set a flag in the call to selectively broadcast to various sets of components, including a set comprised of other user mode applications and a set comprised of ring 0 drivers.

To perform broadcasts to user mode applications initiated by ring 0 drivers, the ring 0 operating system component synchronizes to a user mode operating system component ("message server") responsible for performing broadcasts to user mode applications. When the processor enters a state referred to herein as "application time" in which the message server is running, the ring 0 operating system component can then coordinate a broadcast to user mode applications by the message server as if the broadcast had been initiated by a user mode application. None of the processor's privilege checks are failed because the operations are performed by the message server as a user mode component. This method of "application time processing" also is applicable to ring 0 operating system components and drivers performing other operations in coordination with a user mode component.

The foregoing and other objects, features, and advantages of the invention will become more apparent from the following detailed description of a preferred embodiment which proceeds with reference to the accompanying drawings.

DETAILED DESCRIPTION OF THE PREFERRED EMBODIMENT

Figure 3:
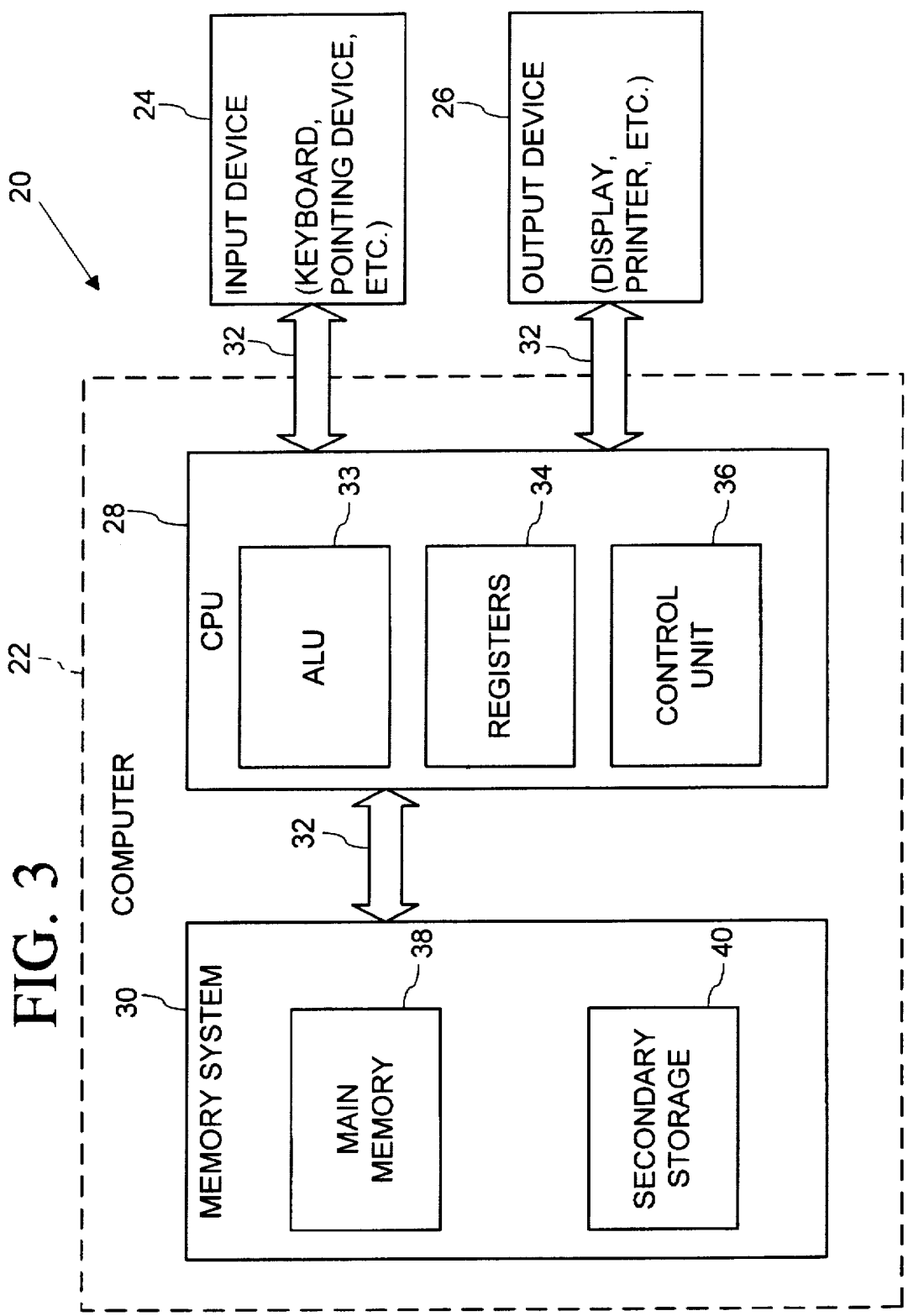
FIG. 3 is a block diagram of a computer system that may be used to implement a method and apparatus embodying the invention.

FIG. 3 is a block diagram of a computer system 20 which is used to implement a method and apparatus embodying the invention. Computer system 20 includes as its basic elements a computer 22, input device 24 and output device 26.

Computer 22 generally includes a central processing unit (CPU or processor) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, pointing device, pen, or other device for providing input data to the computer. Output device 26 may be a display device, printer, sound device or other device for providing output data from the computer. The input and output devices 24, 26 also may include devices for communication with other computer systems, such as a modem, network adapter, and the like.

It should be understood that FIG. 3 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

With reference to FIG. 3, the CPU 28 preferably provides hardware facilities (e.g. registers and control logic) to implement a protection scheme in which executing programs can be allocated by an operating system to various privilege levels or rings 50–53, restricted from accessing the data at higher privilege rings, and restricted from executing code at lower privilege rings as described more fully in the Background of the Invention above. The CPU 28 also preferably provides hardware facilities for implementing multi-tasking. Many such suitable CPUs and protection schemes are conventionally known and available from a variety of vendors, including for example the Intel protected mode microprocessors.

Figure 4:
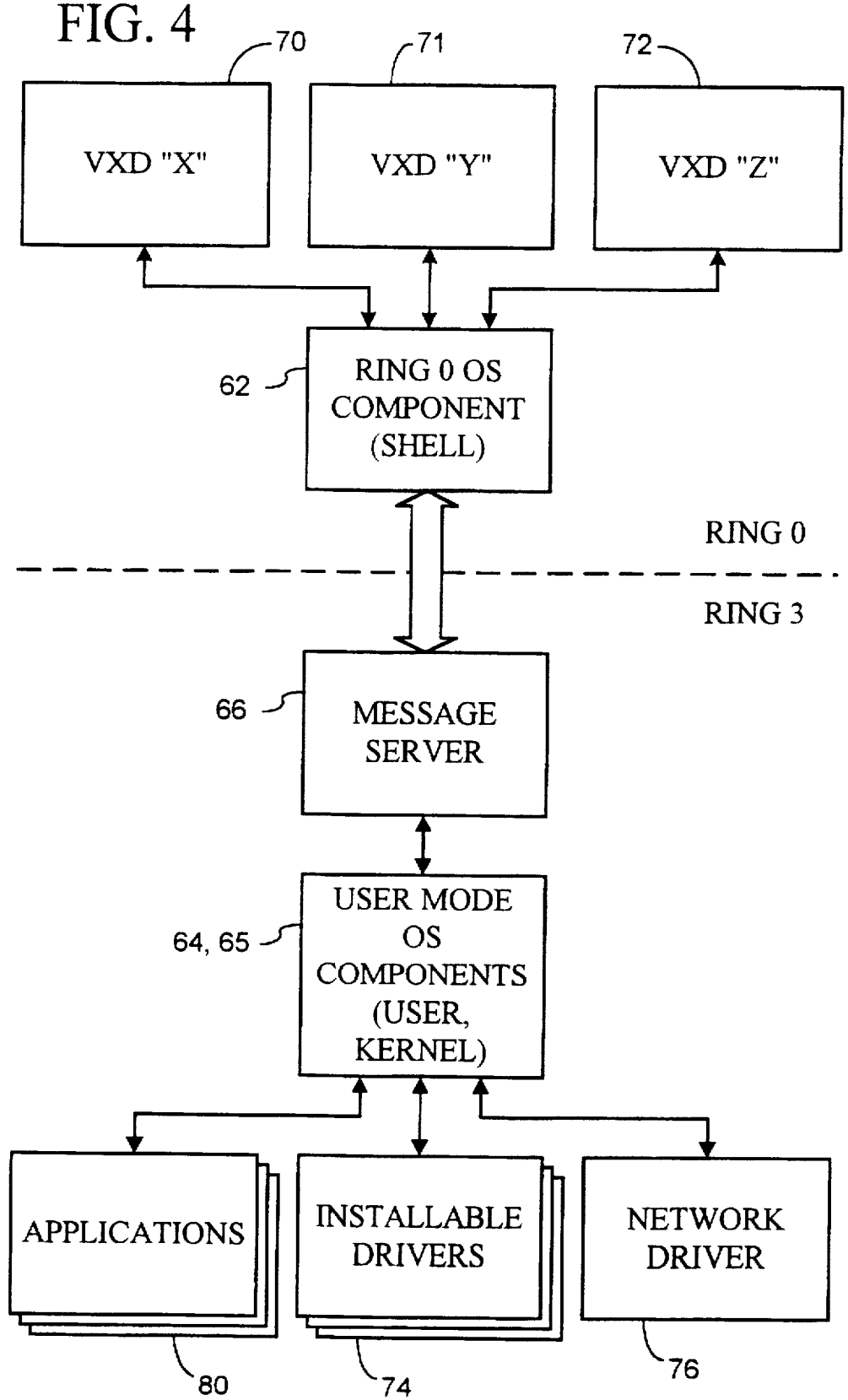
FIG. 4 is a block diagram of operating system components including various drivers, ring 0 and user mode components along with application programs executing on a computer system such as shown in FIG. 3 according to a preferred embodiment of the invention.

FIG. 4 is a block diagram of a portion of an operating system 60 which runs on the computer system 20 (FIG. 3), and provides message broadcasting and application time processing services according to a preferred embodiment of the invention. The operating system 60 comprises an operating system component (hereafter "Shell") 62 allocated at a most privileged ring (i.e. ring 0) of the CPU 28 protection scheme, and user mode operating system components (hereafter "User," and "Kernel") 63–66 allocated at a user mode privilege ring (e.g. ring 3 in the preferred embodiment). The operating system 60 further comprises a component referred to herein as a message server 66 which also is allocated at ring 3. The privilege levels of these components 62, 64, 66 can be allocated, for example, by the operating system setting flags in data structures (termed "descriptors" and "selectors" in computer systems based on the Intel protected mode microprocessors) associated with the components when the components are loaded such as during system initialization. Each of these components 62, 64, 66 are program modules containing executable code and associated data.

The operating system 60 communicates and interacts with the hardware of the computer system 20 (FIG. 3) through various components known as device drivers. In the preferred embodiment of the invention, some of the drivers 70–72 are 32-bit program modules containing executable code and associated data, which are allocated by the operating system at ring 0. These drivers 70–72 are referred to herein as virtual drivers ("VxDs"). While some of the VxDs 70–72 interact directly with hardware devices (e.g. the input devices 24, output devices 26, and storage devices 40 of the computer system 20 (FIG. 3)), the VxDs 70–72 also may include program modules that supply operating system functionality not directly related to any particular hardware device. (The term virtual driver or VxD therefore applies generally to any 32-bit, ring 0 component.) The Shell component 62, for example, is itself a VxD. Other drivers 74, 76 in the preferred embodiment are allocated at a user mode ring, such as ring 3. These include installable drivers 74 which may be provided by the manufacturer or vendor of a particular hardware device and added to the operating system 60 by the user or manufacturer of the computer system 20 to provide interoperability with such device. The user mode drivers also may include a network driver 76 for controlling operations of a network adapter connected as an output device 26 (FIG. 3) of the computer system 20.

The operating system also allocates application programs 80 at a user mode ring (ring 3 in the preferred embodiment). Because of their allocation to a user mode ring, applications 80 and user mode drivers 74, 76 are prevented by the CPU 28 protection scheme from accessing data at more privileged rings, and in particular from overwriting critical operating system data allocated at ring 0. Applications and user mode drivers 74, 76 can make calls to code in components at more privileged rings to access their services, such as through a call gate. The call gate mechanism, however, restricts such calls to more privileged components to preset entry points of functions or procedures. Applications therefore can access operating system services provided by components at more privileged rings, but are otherwise isolated to their own code and data. User mode operating system components such as the User component 64, and the message server 66 are likewise restricted by the CPU protection scheme. To promote system stability and reliability, ring 0 components including the VxDs 70–72 and the Shell component 62 additionally are restricted from directly calling code in components at lower privilege rings.

The applications 80 are run in a multi-tasked manner by the operating system of the preferred embodiment. Each of the applications 80 are allocated one or more threads which are executed in alternating processing time intervals on the CPU 28 (FIG. 3) under control of a task sequencing operating system component ("task sequencer," not shown). In this manner, the threads of multiple applications are allowed to execute for a portion of each second. The applications 80 thus appear to run concurrently on the computer system 20.

The operating system components (Shell, User, and Message Server) 62, 64, and 66 include code which implements message broadcasting and application time processing services according to the invention. These services are accessible to applications 80 and VxDs 70–72 by calling various application programming interfaces (APIs) described below. (Application programming interfaces are procedural interfaces which provide access to operating system services.) The User component 64 provides message broadcasting service APIs which are callable by the applications 80, while the Shell 62 provides message broadcasting and application time processing service APIs which are callable by the VxDs 70–72. Specifications for these APIs are included in an Appendix A attached hereto.

More particularly, the User component 64 has a broadcast system message API which can be called by the applications 80 to initiate message broadcasting to other applications, user mode drivers 74, 76, and VxDs 70–72. The broadcast system message API in the preferred embodiment takes the form indicated by the following statement (in C programming language syntax):

```
BOOL FAR PASCAL BroadcastSystemMessage (
    DWORD      dwflags,
    LPDWORD    lpdwRecipientList,
    UINT       uiMessage,
    WPARAM     wParam,
    LPARAM     lParam);                              (1)
```

Calls to this broadcast system message API in the applications 80 are linked to a function in the User component 64 which implements a service for broadcasting messages to other applications 80, user mode drivers 74, 76, and VxDs 70–72. As indicated by statement (1), this function accepts a plurality of parameters (dwflags, lpdwRecipientList, uiMessage, wparam, and lparam) which characterize the broadcast to be carried out by the User component 64. The function returns a Boolean result to the calling application.

The parameters of the broadcast system message API include a flags parameter (dwflags). The flags parameter is a 32-bit double word value containing a plurality of flags that can be set by a calling application to control various aspects of the message broadcasting operation. These flags (BSF_QUERY, BSF_IGNORECURRENTTASK, BSF_FLUSHDISK, BSF_LPARAMPOINTER, BSF_POSTMESSAGE) and their effects are described in more detail in the specification for the broadcast system message API set forth in the attached Appendix A. Of particular significance is the query flag (BSF_QUERY), which can be set to indicate that the message being broadcast is a query message. When the query flag is set, the value returned by each recipient of the message is examined before broadcasting to the next designated recipient. If a recipient returns a true value, the broadcasting is continued to the next recipient. If the recipient's returned value is not true, the broadcasting is discontinued and a boolean "false" result is returned by the API to the calling application. When all recipients' returned values are true, a boolean "true" result is returned by the API to the calling application. When the query flag is not set, the message is broadcast to all designated recipients and their return values are ignored. Query messages can be broadcast to determine whether a particular action is acceptable to other applications and drivers, such as system shutdown or a configuration change. Any application or driver which would be adversely affected by the action (such as by data loss or the like) can indicate their nonacceptance of the action by a false return value.

Another of the broadcast system message API's parameters is a recipient list parameter (lpdwRecipientList) which can be set by the calling application to designate the broadcast's recipients. In the preferred embodiment, the recipient list parameter is a long pointer to a double word value. As described in the API specification in Appendix A, a number of flags for this parameter are defined as follows (again in C programming language syntax):

| #define BSM_ALLCOMPONENTS | 0x00000000 |
|---|---|
| #define BSM_VXDS | 0x00000001 |
| #define BSM_NETDRIVER | 0x00000002 |
| #define BSM_INSTALLABLEDRIVERS | 0x00000004 |
| #define BSM_APPLICATIONS | 0x00000008 |

By setting the double word value of the recipient list parameter to any of these defined values (or an OR combination thereof), the calling application can select the recipients of the broadcast to be the VxDs 70–72, the installable drivers 74, the network driver 76, and/or the applications 80. In processing the broadcast, the User component 64 updates this double word value to indicate which components actually received the message. The calling application can examine the double word on its return from the API call to determine this information.

The remaining parameters (uiMessage, wParam, lParam) of the broadcast system message API are used by the calling application to specify the message to be broadcast and its parameters. Some examples of messages that can be sent are the following:
WM_QUERYENDSESSION
WM_ENDSESSION
WM_DEVICECHANGE
Some messages may include sub-messages which are indicated by the wParam message parameter. For example, the following sub-messages of the WM_DEVICECHANGE message are indicated by setting its wParam parameter:
DBT_DeviceArrival
DBT_DeviceQueryRemove
DBT_DeviceQueryRemoveFailed
DBT_DeviceRemovePending
DBT_DeviceRemoveComplete
DBT_DeviceTypeSpecific
DBT_ConfigChanged
DBT_DevnodesChanged The operating system also may include APIs by which applications can define their own messages (referred to as user-defined messages).

The Shell 62 also has a broadcast system message API which is callable by the VxDs 70–72 to initiate message broadcasting. The Shell's broadcast system message API takes the same form as that of the User component 64 given in statement (1) above. In the preferred embodiment, the Shell's broadcast system message API utilizes application time processing described below, and consequently must be called at application time.

The Shell 62 additionally has a hook system broadcast API. The Shell's hook system broadcast API is used by the VxDs 70–72 to register a hook function with the Shell 62. During message broadcasting, the Shell calls the hook functions in a particular call order to notify the VxDs of the message being broadcast. (In the case of a query message, the Shell halts after the first hook function returning a zero or false value.) only those VxDs which register a hook function with the Shell 62 will be able to receive broadcast messages. The hook system broadcast API takes the form of the following statement (in C programming language syntax):

```
int_cdecl SHELL_HookSystemBroadcast (
    DWORD pfnHandler,
    DWORD dwRef,
    DWORD dwCallOrder)                                      (2)
```

This API includes parameters for a pointer to a handler of the hook function (pfnHandler), reference data to be used when calling the function(dwRef), and a call order priority (dwCallOrder). In the preferred embodiment, the call order priority parameter indicates the position of the hook function in the Shell's calling order (e.g. one to indicate first, etc.), or zero for an undefined priority (called in order of registration). The hook function preferably includes code for processing any messages received during message broadcasting.

The Shell 62 also has an unhook system broadcast API which can be called by a VxD to remove its hook function from the Shell's register. The unhook system broadcast API takes the form of the following statement (in C programming language syntax):

```
int_cdecl SHELL_UnhookBroadcast (DWORD hbh)                 (3)
```

In addition to the message broadcasting APIs, the Shell 62 has APIs for application time processing. Application time processing allows a VxD to perform operations as a user mode application. The Shell has a "call at application time" API which a VxD calls to set up application time processing, such as for message broadcasting by one of the VxDs 70–72 to the applications 80. By calling this API, the calling VxD installs a callback function which the Shell calls when application time processing becomes available. The call at application time API takes the following form of the statement (in C programming language syntax):

```
int_cdecl SHELL_CallAtAppyTime (
    DWORD    pfnCallback
    DWORD    dwRefData
    DWORD    flAppy)                                        (4)
```

The Shell also has a "cancel application time event" API with which a previously installed callback function can be canceled. The cancel application time event API takes the form of the following statement (in C programming language syntax):

```
int_cdecl SHELL_CancelAppyTimeEvent (
    DWORD    eventHandle)                                   (5)
```

As described more fully below, application time processing is not always available. So that VxDs can determine if application time processing is available, the Shell provides a "QueryAppyTimeAvailable" API which returns a non-zero value in a processor register (e.g. an EAX register in the Intel protected mode processors) if application time processing is available.

Figure 5:
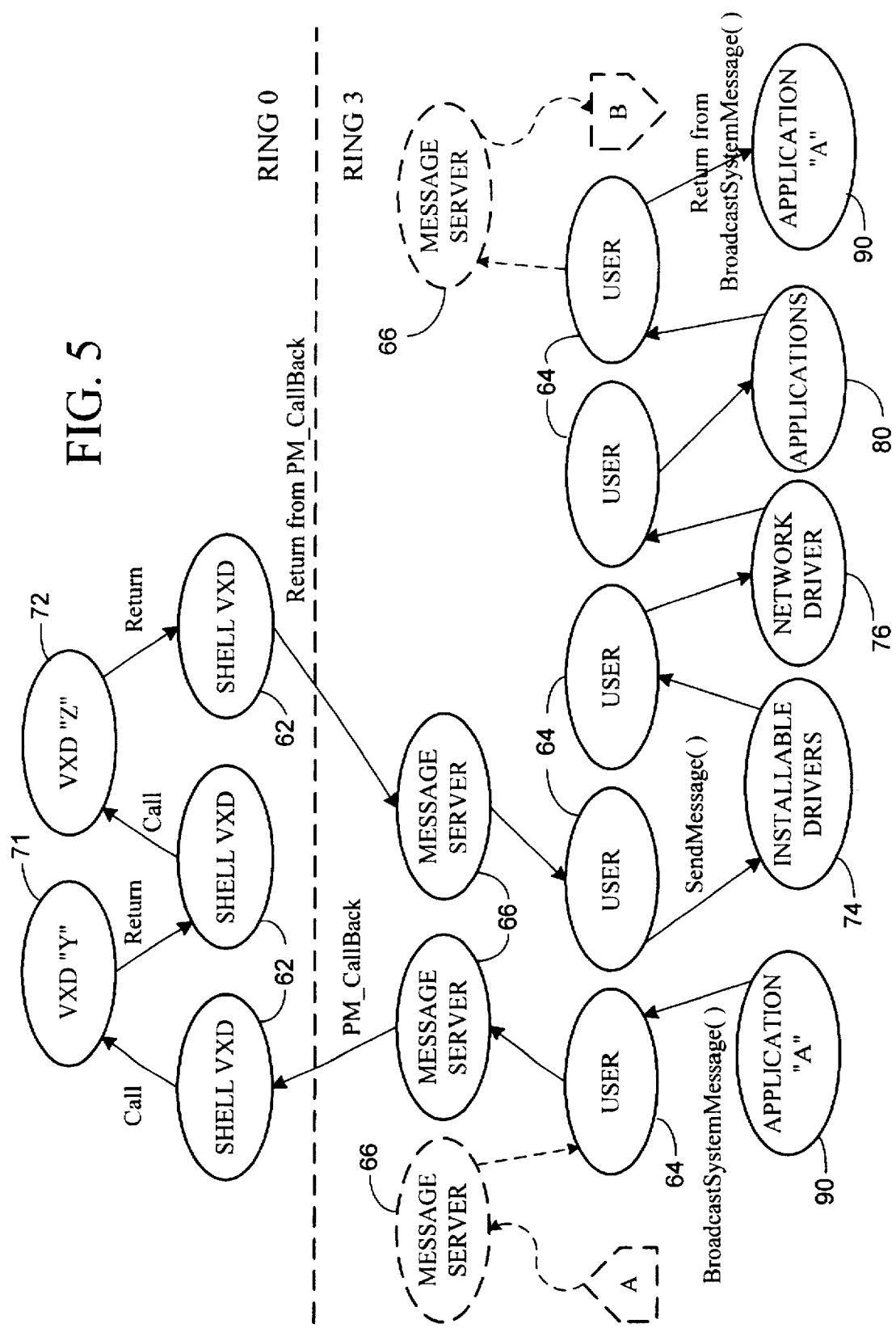
FIG. 5 is a process flow diagram of message broadcasting in the operating system of FIG. 4 in response to a broadcast system message API call of a user mode application, including broadcasting to ring 0 virtual drivers.

FIG. 5 shows message broadcasting by the User component 64 in response to a call to the broadcast system message API by a user mode thread of one of the applications 80, e.g. an application program ("application A") 90. The user mode thread, while executing code in the application 90, initiates message broadcasting by a call 96 to the broadcast system message API of the User component 64. In the call 96, the application 90 passes parameters to specify the message to be broadcast ("the broadcast message"), its recipients, and other particulars of the broadcast as described above. In response, the user mode thread commences executing a function in the User component 64 which implements the process of broadcasting the broadcast message to those components selected by the recipients list parameter as specified in the call 96.

The message is broadcast first to those VxDs which have registered a hook function with the Shell 62, unless VxDs are not selected in the recipient's list parameter specified by the application 90. (If VxDs are not selected, broadcasting to VxDs is bypassed.) In the preferred embodiment, communications between components at ring 0 and at ring 3 related to message broadcasting are handled by code in the message server 66. Accordingly, to communicate to the Shell 62 that the broadcast message is to be broadcast to VxDs, the User component 64 function performs a call 98 to a function provided in the message server 66 which, in turn, calls (100) the Shell 62. In the call 100 to the Shell, the message server uses an operating system service referred to herein as a protected mode call back (PM_CallBack) to make the transition to ring 0. The protected mode call back 100 can be implemented, for example, as a call through a call gate on the Intel protected mode processors. Since such calls to ring 0 code can be made by a user mode thread without generating a protection fault, the entire message broadcasting operation including broadcasts to the virtual drivers 71, 72 can be made by the single user mode thread of the Application 90.

The Shell 62 code invoked by the Protected mode call back 100 sends the broadcast message to any VxDs (e.g. VxDs 71, 72 in the illustrated example) which have registered hook functions with the hook system broadcast API described above. The Shell 62 preferably calls 102, 104 the hook functions in an established order (such as specified by the call order parameters of the hook system broadcast API calls which registered the hook functions). The hook function of each VxD processes the message for the VxD, and generates and returns 103, 105 a return value from the VxD. If the broadcast message is a query (the BSF_QUERY was set in the call 96 to the broadcast system message API by the application 90), the Shell 62 ceases the calls to the hook functions on the first VxD to return 103, 105 a zero or false value. For example, in the message broadcasting illustrated in FIG. 5, the Shell 62 will bypass the hook function call to VxD "Z" if the broadcast is a query and the hook function call to the VxD "Y" 71 returns 103 a zero. After the broadcast message has been sent to each VxD having a registered hook function, the message broadcasting operation returns 106 from the protected mode call back 100 to the message server 66, then from the message server function to the User 64 code. The protected mode call back return transition 106 from ring 0 to ring 3 can be implemented, for example, as a call gate return on the Intel protected mode processors.

Figure 2:
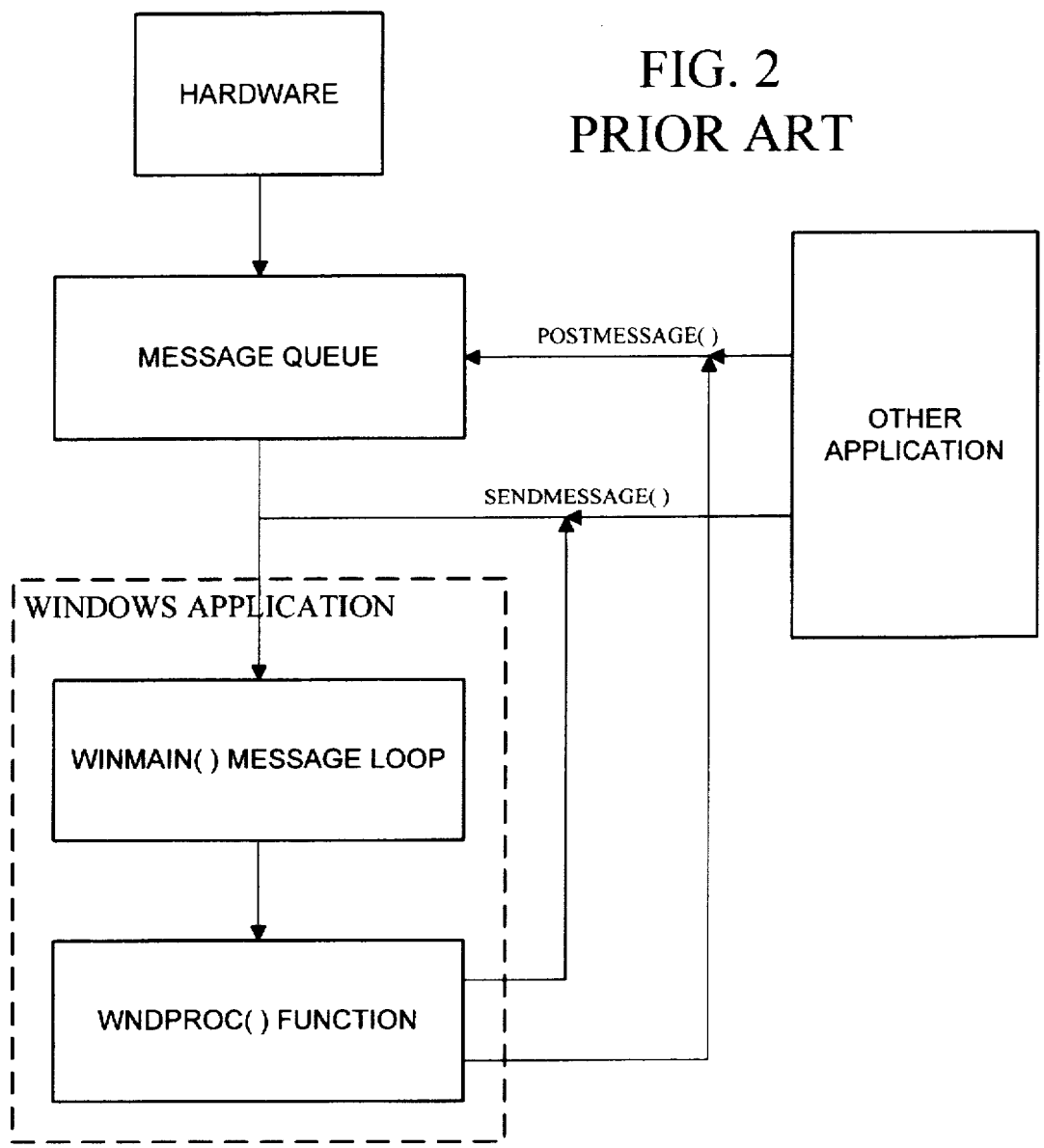
FIG. 2 is a diagram of message handling services provided in previous versions of Microsoft Corporation's Windows operating system.

The function in the User component 64 continues the message broadcasting by sending 110, 112, 114 the broadcast message to those of the installable drivers 74, the network driver 76, and the applications 80 selected by the recipients list parameter. (Those not selected are bypassed.) The broadcast message preferably is sent to each of these components using a send message service provided by the operating system, such as the send message service provided in Microsoft Corporation's Windows operating system which is illustrated in FIG. 2 and described in the Background of the Invention above. The send message service directly calls the message processing functions (e.g. WndProc( )) of the user mode drivers and applications, bypassing their message queues. These functions process the broadcast message for their respective driver or application and generate a return value when returning 111, 113, 115 to the User component function. The User component 64 also ceases any further sending of the message to the drivers 74, 76 and applications 80 for the first of these functions to return a zero or false value, if the broadcast is a query.

After the broadcast message has been sent to each of the recipient components selected by the recipient list parameter (or a zero is returned by any of the selected recipients in a query broadcast), the User 64 returns 118 a Boolean return value to the application 90. If the broadcast is a query, the User component 64 generates a return value which indicates whether all the recipient components accepted the message, and additionally updates the recipient list parameter to indicate which recipients rejected the message. If not a query, the return value is always true.

Figure 1:
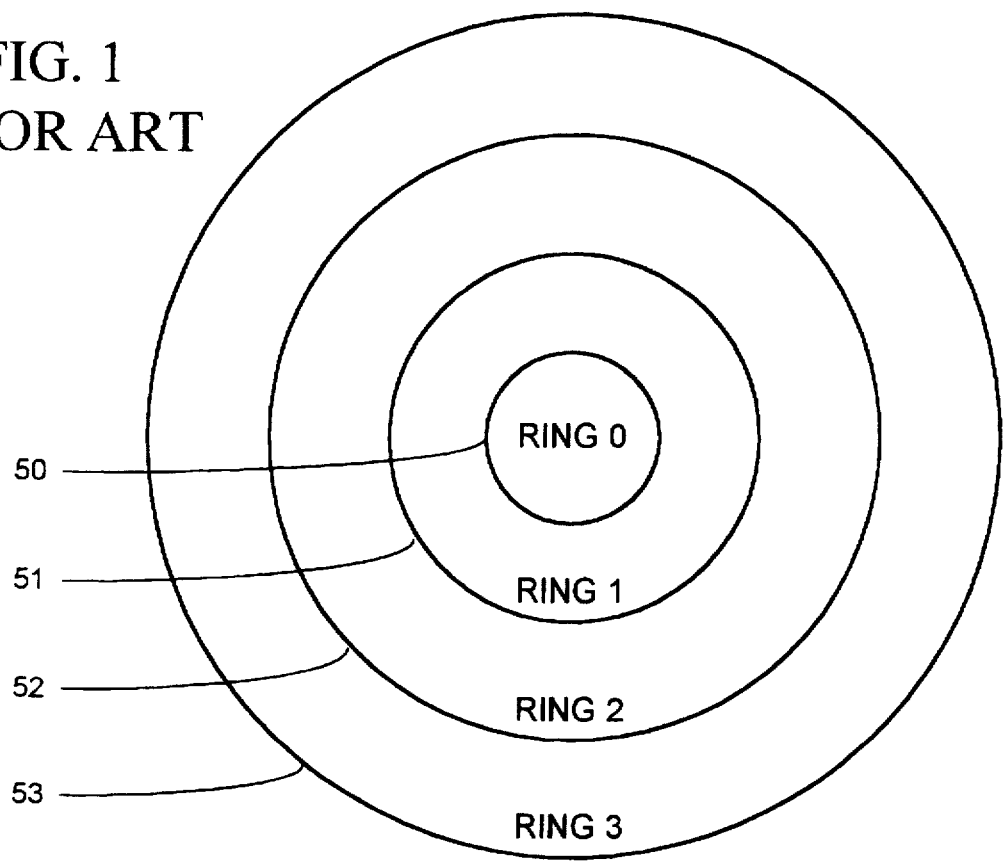
FIG. 1 is a diagram of a protection scheme used in Intel 80386, 80486, and Pentium microprocessors (the Intel protected mode microprocessors).

The entire message broadcasting operation initiated by applications in the preferred embodiment illustrated in FIG. 5 is performed by a single one of the multi-tasked threads of applications allocated to ring 3 (FIG. 1). Because the thread is allocated at ring 3, the transition to ring 0 for message broadcasting to VxDs 70-72 can be made through a call gate or the like as allowed by the protection scheme of the CPU 28 (FIG. 3). The protection scheme of the CPU 28, however, prohibits ring 0 components (i.e. VxDs 70-72 and the Shell 62) from directly calling code in user mode components (i.e. the User component 64, the message server 66, the applications 80, and the drivers 74, 76). A multi-tasked thread allocated at ring 0 and executing code in a VxD therefore is prevented by the protection scheme from entering ring 3 code, such as the message processing functions for the user mode applications 80, and drivers 74, 76. In order to perform message broadcasting operations, however, the message processing functions of user mode applications and drivers preferably are entered.

The preferred embodiment of the present invention provides for executing of operations initiated by a ring 0 component, such as a VxD, as a user mode thread through application time processing. Application time processing permits a ring 0 component (e.g. a VxD) to take over control of a user mode thread to perform an operation. Because the operation is performed by a user mode thread, the operation appears to the CPU 28 to be executed as if by any other user mode thread. Since a user mode thread is required for application time processing, such processing is not available before the operating system initializes, after operating system shutdown begins, or if the user mode thread being used for the processing becomes nonviable (such as when the user mode thread generates a general protection fault).

Figure 6:
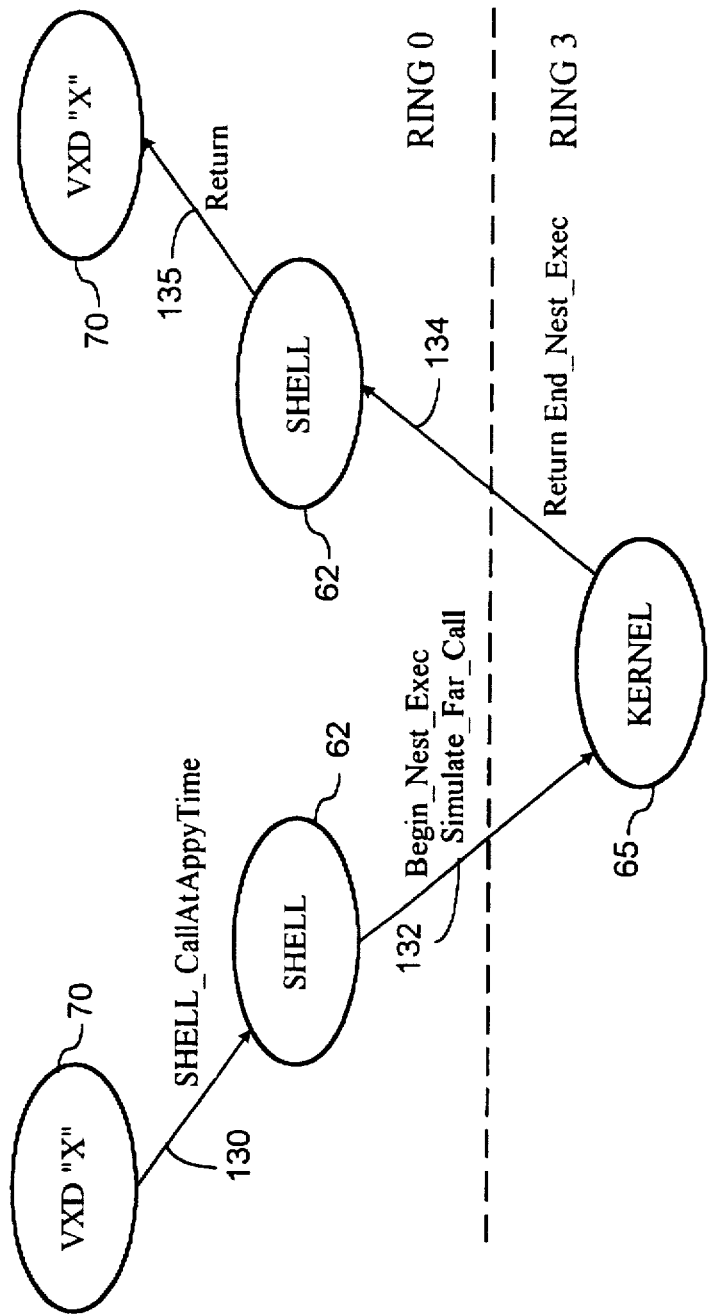
FIG. 6 is a process flow diagram of a ring 0 virtual driver initiating application time processing in the system of FIG. 4.
Figure 7:
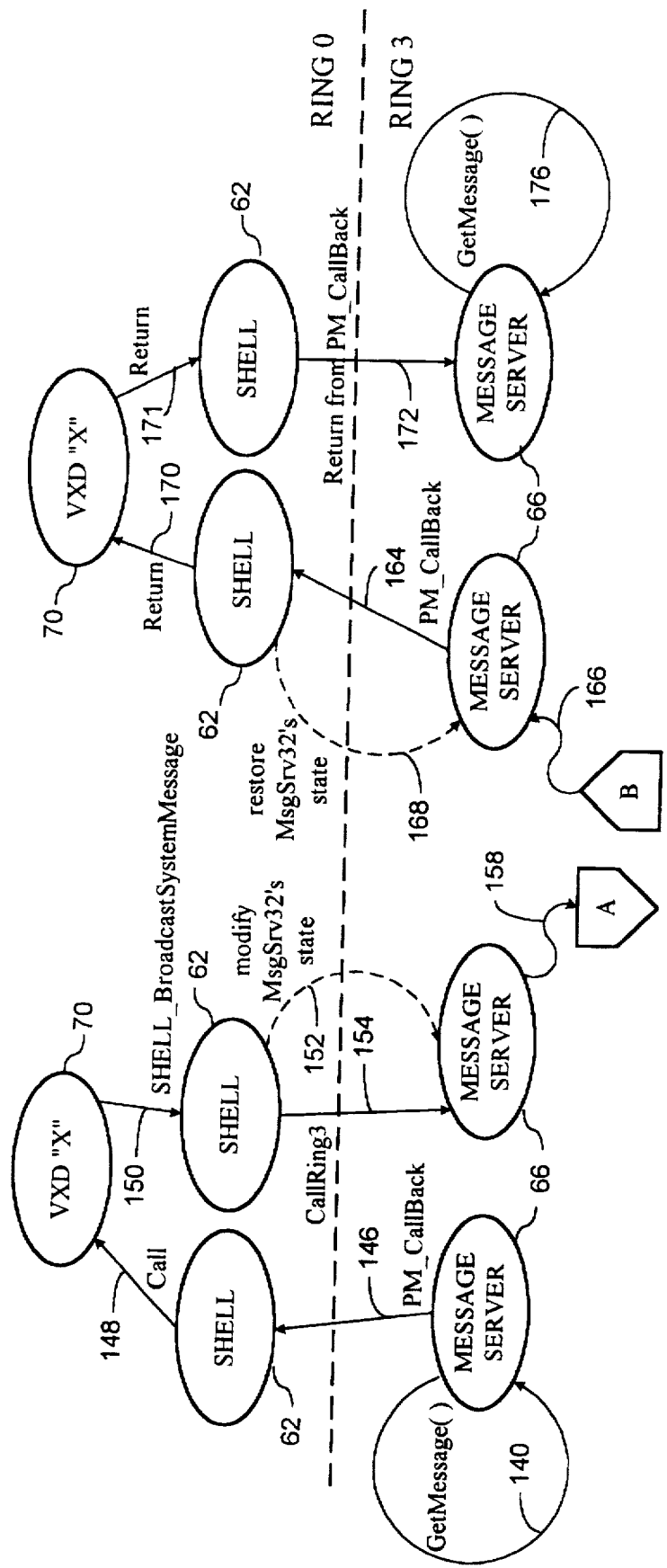
FIG. 7 is a process flow diagram of message broadcasting in the system of FIG. 4 utilizing application time processing for a ring 0 virtual driver to broadcast messages to user mode applications.

FIGS. 6 and 7 show an exemplary message broadcasting initiated by the VxD "X" 70 using application time processing according to the preferred embodiment of the invention. With reference to FIG. 6, application time processing is begun by making a call 130 to the CallAtAppyTime API of the Shell 62 described above. This API call 130 serves to request application time processing of an operation for the VxD X, and installs a callback function to the VxD X used later in application time processing. In response to the API call, the Shell 62 posts a message requesting application time processing ("appy time request message") to the message queue of the user mode thread which is used for application time processing. In the preferred embodiment, this thread is a thread of the message server 66. The Shell 62 posts the appy time request message by calling 132 an operating system service provided by the ring 3 Kernel operating system component 65. The operating system in the preferred embodiment is set up to allow calls from ring 0 to the post message service of this ring 3 component despite the CPU protection scheme violation. After posting the appy time request message, returns 134-135 are made to the Shell 62 and VxD 70.

Referring now to FIG. 7, when messages are posted to a user mode thread, the task sequencer of the operating system gives a higher priority to the thread in determining CPU processing time allocations. Accordingly, when the appy time request message is posted to the message queue of the message server's thread, the thread, in effect, "wakes up" to attend to processing of the message. The thread first executes in the message server's message loop (if still processing any prior messages, the thread eventually returns to this message loop). In the message loop, the thread retrieves the appy time request message from its queue with a call 140 to the get message API and dispatches the appy time request message to the message server's message processing function with a call to the DispathMessage API. Such message loops and the API functions included therein are described more fully in the Background of the Invention above.

The message server's message processing function responds to the appy time request message by making a call 146 to a function in the Shell 62 using the protected mode callback service. The function in the Shell 62 then calls 148 the VxD X's callback function which was installed by the VxD X's CallAtAppyTime API call 130 (FIG. 6). The code of the callback function of the VxD X 70 can now begin the operation for which the VxD requested application time. To begin the message broadcasting operation, the VxD X's callback function makes a call 150 to the Shell's broadcast system message API, passing parameters specifying the message to be broadcast and its recipients.

The Shell responds to the VxD X's broadcast system message API call 150 by modifying 152 the ring 3 state of execution of the message server thread (i.e. the saved state of the processor registers) so that, upon a return 154 of the thread to ring 3, the message server thread is set up to make a broadcast system message API call 158 to the User component 64 as a ring 3 application on behalf of the VxD. The message server thread's previous ring 3 state also is saved elsewhere by the Shell 62 for later restoration. The Shell 62 further sets up a return address which points to a protected mode call back 164 to the Shell. With the message server thread set up to make the VxD's broadcast system message API call 158, the thread then makes the return transition 154 back to ring 3 from the Shell 62.

With reference to FIG. 5, after returning to ring 3, the message server thread proceeds to perform the VxD X's message broadcasting operation beginning with the broadcast system message API call 158 to the User component 64. The message broadcasting operation is performed by the user mode message server thread just as if the message broadcasting had been initiated by any other user mode component's thread (e.g. the thread of Application A).

After the message broadcasting operation (FIG. 5) is complete, the message server thread returns 166 from the broadcast system message API call 158 to the message server code 66. As described above, when modifying the ring 3 execution state of the message server thread, the Shell 62 set up a protected mode callback 164 to the Shell. Accordingly, the thread then returns via the protected mode callback 164 to the Shell 62.

Back in the Shell's code, the message server thread restores 168 the thread's previous ring 3 execution state that was in effect prior to the VxD X's call 150 to the Shell broadcast system message API. Returns 170–172 are then made back out of the Shell's broadcast system message API function, the VxD X's callback function, and the message server's message processing function. The message server thread can then resume its message loop 176. If no messages remain in its message queue, the operating system task sequencer ceases allocating CPU processing time to the thread until another message is posted.

The message broadcasting operations of VxDs just described permits nested broadcasting. Referring to FIG. 5, when processing a broadcast message in the hook function of the VxD "Y" 71, for example, the VxD 72 can itself initiate its own message broadcasting operation as described above.

The application time processing provided in the preferred embodiment of the invention also can be utilized by ring 0 components to perform operations other than message broadcasting in user mode code. In fact, any function call that can be made by applications can be made by ring 0 VxDs utilizing application time processing, such as file system accessing, and memory allocation calls, among others.

To prevent indiscriminate calling of user mode code (which may be potentially de-stabilizing for the operating system due to the reliance of ring 0 operating system code on user mode code) in some alternative embodiments of the invention, ring 0 components such as VxDs can perform message broadcasting including broadcasting to user mode components other than through use of application time processing. In a first alternative embodiment, separate ring 0 and user mode threads are provided. The VxDs then make transitions to ring 3 code by the ring 0 thread signaling the user mode thread, and blocking on a semaphore. The user mode thread then begins execution, and performs the user mode side of the message broadcasting operation. When finished, the user mode thread signals the ring 0 thread and itself blocks on the semaphore to return execution to the ring 0 thread. The user mode thread can be created anew each time user mode operations are to be executed, or the same user mode thread alternatively can be used each time.

In a second alternative embodiment, continuation passing with a single user mode thread is used for the VxD's message broadcasting. The user mode thread makes a call into a ring 0 component. In the ring 0 component a full save of the ring 0 state is done. A transition back to user mode to perform user mode operations can then be made via a return from the call to the ring 0 component. After completing the user mode operation, the thread again calls into the ring 0 component where the previously saved state is restored until the next "return call" to user mode code is needed.

Event Notifications and Processing Under Chicago BroadcastSystemMessage API

BroadcastSystemMessage can be used to notify other components in the system of a change in the system state. For example, a disk being ejected, or the system being shut down. This API can be called to broadcast a system message to one or more of the following components of the system:

Virtual device drivers (VxDs)

The network driver

Installable Windows ring 3 drivers

Windows applications

Prototype

| | |
|---|---|
| BOOL FAR PASCAL | BroadcastSystemMessage (DWORD dwFlags, LPDWORD lpdwRecipientList, UINT uiMessage, WPARAM wParam, LPARAM lParam); |

DWORD dwFlags

This can have one or more of the following flags:

BSF_QUERY: If this flag is set, then when the message is broadcast to each item, the return value will be looked at and iff the return value is TRUE, it will be sent to the next. If this flag is not set, then the return value of Send messages are ignored and the message is sent to all.

BSF_IGNORECURRENTTASK: If this flag is set, this message won't be sent to windows that belong to the current task. (This is required for WM_QUERYENDSESSION which is not sent to the current app).

BSF_FLUSHDISK: If this flag is set, after each SendMessage( ), the disk will be flushed. (This is required for WM_ENDSESSION when apps are terminating).

BSF_LPARAMPOINTER: If this flag is set, lParam is a long pointer to a buffer; The first WORD pointed to by this pointer contains the total size of the whole buffer (including the size field).

BSF_POSTMESSAGE: If this flag is set, the message will be posted; Otherwise, it will be sent. You cannot use this flag when the lParam is a pointer to a buffer or if this is a query.

LPWORD lpdwRecipientList

This is a long pointer to a DWORD; The caller can specify a list of components that is to receive this system message in a DWORD and pass a pointer to that dword; on return from this function, this WORD will be updated to indicate the components that actually received the message. By looking at this WORD, the caller can determine which component actually failed this call.

| | |
|---|---|
| #define BSM_ALLCOMPONENTS | 0x00000000 |
| #define BSM_VXDS | 0x00000001 |
| #define BSM_NETDRIVER | 0x00000002 |
| #define BSM_INSTALLABLEDRIVERS | 0x00000004 |
| #define BSM_APPLICATIONS | 0x00000008 | uiMessage, wParam, lParam

These parameters are specific to the system message being broadcast.

Returns

If the caller sets BSF_QUERY, then the return value indicates whether all components accepted the message or not. If it returns FALSE, it means that someone failed. Look at *lpwRecipientList to see the components that actually received this message.

If BSF_QUERY is not set, the return value is always TRUE, indicating that all components received this message.

Remarks

VxDs must call SHELL_HookSystemBroadcast to receive system broadcast messages.

Net driver will have a special entry point for this; This entry point gets called with the uiMessage, wParam, lParam parameters. (We intend to use the same entry point that was used by ENDSESSION notifications).

The chain of Installable drivers gets called with the new driver message DRV_NOTIFYMSGS. wParam is zero. The lParam of this driver message is a structure that contains all the original params of the system message.

All the apps get notified by enumerating the unowned top level windows and then sending the message to them.

EXAMPLE

As an example, the following piece of code indicates how this new API can be used to broadcast the WM_QUERYENDSESSION and the subsequent WM_ENDSESSION messages:

```
//      This end_session query must go to all components.
dwRecipientList = BSM_ALLCOMPONENTS;
fQuit = BroadcastSystemMessage
           (BSF_Query | BSF_IGNORECURRENTTASK,
           (LPDWORD)&dwRecipientList,
           WM_QUERYENDSESSION, (WPARAM)0,
           (LPARAM)0L);
//      Now, fQuit is TRUE if we got permission to quit. FALSE,
Otherwise.
//      Now, dwRecipientList contains the list of components that received
//      the WM_QUERYENDSESSION message. Let us broadcast
ENDSESSION to      //      only those components that received
QUERYENDSESSION earlier.
  BroadcastSystemMessage (BSF_FLUSHDISK |
BSF_IGNORECURRENTTASK, (LPDWORD) & dwRecipientList,
WM_ENDSESSION, (WPARAM)fQuit, (LPARAM)0L);
```

Processing System Broadcasts from a VxD

Virtual device drivers can send and receive system broadcast messages under Chicago. The notification services are provided by the shell VxD. To receive system broadcast messages, VxDs must call the SHELL_HookSystemBroadcast API. To send system notifications, VxDs must call the SHELL_BroadcastSystemMessage API at 'appy time.

SHELL_HookSystemBroadcast API

Installs a procedure to be called whenever a BroadcastSystemMessage is performed.

Prototype

```
int_cdecl SHELL_HookSystemBroadcast (DWORD pfnHandler,
           DWORD dwRef,
           DWORD dwCallOrder);
``` pfnHandler
    Procedure to call
dwRef
    Reference data for callback
dwCallOrder
    This parameter can be used to enforce a particular call ordering between VxDs. Specific values for this parameter have not yet been defined, so all callers should specify 0 for this parameters which indicates "Undefined call order."

Returns
    EAX=handle to broadcast node on success =0 on failure to install
Uses C standard
Callback

```
int_cdecl SHELL_BroadcastCallback (DWORD dwFlags,
           DWORD dwRecipientList,
           DWORD uMsg,
           DWORD wparam,
           DWORD lparam,
           DWORD dwRef);
``` dwflags
    Flags passed to BroadcastSystemMessage
dwRecipientList
    Recipient flags passed to BroadcastSystemMessage
uMsg
    Message number (HIWORD is reserved for future use)
wParam
    Windows wParam for message (HIWORD is reserved for future use)
lParam
    Windows lParam for message
dwRef
    Reference data passed to _SHELL_HookBroadcast.
    The return value from the callback is ignored if the broadcast is not a BSF_QUERY. Otherwise, the callback should return a nonzero value to allow the broadcast to continue, or zero to fail the message and halt the broadcast.

Remarks
    The hook does not take effect until the *next* broadcast. If there is a broadcast in progress, the callback will not be called for that broadcast.

SHELL_UnhookSystemBroadcast API
    Removes a procedure from the broadcast notification chain.

Prototype
    int_cdecl SHELL_UnhookBroadcast (DWORD hbh);
hbh
    Handle of broadcast hook as supplied to _SHELL_HookBroadcast. 0 is a valid argument, it causes nothing to be unhooked
Returns None
Uses C standard
Remarks
    A broadcast hook can be unhooked while it is being serviced. In which case, it will receive no further broadcasts, not even broadcasts triggered by the hook itself before returning.

SHELL_BroadcastSystemMessage API

This API is identical to the BroadcastSystemMessage API supported by Windows User.

WM_DEVICEBROADCAST Message

Device drivers can use the BroadcastSystemMessage API to notify other system components of hardware events. A unique Windows message, WM_DEVICEBROADCAST, has been reserved for event notifications under Chicago. Windows applications, drivers, and VxDs can all monitor these device broadcast messages and use the information to gracefully shut down or modify a particular device. The wParam specifies the type of device broadcast, and the lParam contains broadcast-specific data. The lParam may be a pointer to a buffer (which must always begin with a word size field) or it may contain all of the data used for the notification. The meaning of lParam is closely tied to the value of wParam.

The following is a table of the currently defined wParam values and their corresponding lParams.

Hardware Device Notifications

DBT_DEVADD

DBT_DEVQUERYREMOVE—Query message. May be failed.

DBT_DEVQUERYREMOVEFAILED

DBT_DEVREMVOVED

The lParam for these messages is a device node handle.

Logical Drive Notifications

DBT_DRIVEADD

DBT_DRIVEQUERYREMOVE—Query message. May be failed.

DBT_DRIVEQUERYREMOVEFAILED

DBT_DRIVEREMOVED

The low byte of the lParam is a zero-based volume number where drive A=0, B=1, etc.

The high word of the lParam contains flags

0x0001—indicates media being removed/added. Logical device has not changed.

Other flags undefined and will be zero.

CHICAGO PLUG & PLAY MESSAGING OVERVIEW

Chicago, although based on Windows 3.1, contains several enhancements to the messaging architecture and also includes several new messages for Plug & Play which can be of use to applications and device drivers. The following will describe changes to the messaging architecture as well as describe in detail the new messages available.

Introduction

Chicago's Plug and Play framework provides an excellent means for notifying device drivers written for Plug and Play devices to deal with dynamic configuration events such as device insertion and device removal. This is accomplished by the Config Manager calling the individual devnode drivers with the CONFIG_TEST, CONFIG_STOP, or CONFIG_START entry codes, for example.

However, applications and drivers which are not directly tied to a particular piece of Plug and Play hardware require a similar means of being notified of configuration change events, which gives them the capability to prepare for, or abort, potentially dangerous actions before it is too late.

To this end, the DevLoader for each individual subsystem (for example, IFSMGR or IOS, VCOMM, etc.) is responsible for translating the devnode-level events into standard Windows messages which translate the devnode-specific event into a form that an ordinary application can use. In general, the DevLoaders must generate one or more WM_DEVICECHANGE messages, using the submessage types specified below and a packet structure which makes sense for that particular device class. The applications may care about some of these messages but not necessarily all, hence it is important for the devloaders to generate the widest possible coverage to ensure that applications pick up the appropriate events.

Note that power management events passed to the DevLoaders may in some cases also require generation of WM_DEVICECHANGE messages for applications as well. For example, while many applications might not care directly if the machine is suspended, they certainly would care if the suspend indirectly causes the loss of a user's file currently open via a network connection.

Plug and Play Messaging

The Plug and Play subsystem relies mostly on the existing Windows messaging architecture to pass event information around between the Config Manager, the devnodes, other device drivers, and applications.

The Plug and Play messages are all based on the message WM_DEVICECHANGE, where the wParam is set to the particular sub-message being sent and the lParam is set with a value appropriate to the particular message. The submessages are defined in the Chicago DDK file DBT.H.

In Windows 3.1, VxD's could not send or receive messages in a synchronized manner with respect to Ring 3 applications and drivers. In Chicago, the SendMessage API in USER.EXE has been enhanced as described below.

Typically, events are generated at a very low level based on things such as changes in power management status, dock or undock requests, or insertion/removal of dynamic devices such as PCMCIA cards. While the first messages that get generated are of use only to the particular devnode which cares about the device, this will typically cause the individual subsystems to generate additional messages which applications can make more use of. Later in the document we will describe the messages generated at each of the appropriate levels.

Enhancements to the Messaging Architecture

On a call to SendMessage, the message can be sent to the following components in the following order:

1. MsgsSrv32.EXE: This component acts as an application on behalf of the VxD's in the system. MsgSrv32 takes the message from SendMessage, makes a transition to protected mode, and broadcasts the message in turn to each VxD who has registered a message handler (exactly analogous to an application's WinProc) via the SHELL_Hook-System_Broadcast service.

2. Network drivers

3. Ring 3 .DRV drivers

4. Applications

Any of the above classes of message handlers can be excluded or included depending on a flag set in the SendMessage call.

VxD's can send messages to the other components using the SHELL_Broadcast_Message service. Note that although it is possible for VxD's to send messages to other VxD's using this mechanism, it is extremely inefficient when compared with a direct call to the appropriate VxD.

WM_DEVICECHANGE submessages

Wparam is to be an ordinal containing one of the following message types:

DBT_DeviceArrival System detected a new device.

DBT_DeviceQueryRemoval System wants to remove specified device, recipients may fail this message to abort the removal.

DBT_DeviceQueryRemoveFailed System has aborted the removal of the device.

DBT_DeviceRemovePending System is about to remove specified device, not failable.

DBT_DeviceRemoveComplete System has removed the specified device.

DBT_DeviceTypeSpecific Device-specific event not listed above.

Other submessages not directly related to device removal/insertion are as follows:

DBT_ConfigChanged This message indicates a change in the "Current Config" due to a dock or undock event. Any application or drivers which store data in the registry based on the predefined key HKEY_CURRENT_CONFIG should refresh this data upon receiving this message.

DBT_DevnodesChanged lParam in this case points to the root devnode. This message is sent after devnodes have been modified in some way, added, or removed. In the future, stopping a devnode will also generate this message. This message is intended as a high level notification for anybody who cares about the state of a devnode or the resources used by a particular devnode.

Important notes

Any device driver which wants to do some form of preparation for an impending device removal should do so upon receiving the DeviceRemovePending message. However, DeviceRemoveComplete events may be generated at any time with no prior warning via a corresponding DeviceQueryRemove or DeviceRemovePending message. In this case, the application or driver simply needs to recover from the loss of the device to the best of its ability. Typically, a device which has software-controllable ejection or locking will provide DeviceRemovePending first, which allows applications and drivers to terminate their use of the device gracefully. In some cases, DeviceQueryRemove messages might not be issued prior to the device removal if the removal needs to be forced by the operating system.

End user applications must not rely on the DBT_DevnodesChanges message, as non-Chicago operating systems (i.e. NT) may not support this in the future.

Removable media events are facilitated by a flag associated with the logical volume device type as discussed below.

lParam contains a pointer to a packet containing information about the device in question along with specifics depending on the class of device.

DEVICE BROADCAST PACKET STRUCTURE

The packet is in the following form:

DWORD Size Size of packet in bytes.

Applications must not rely on this parameter containing any particular value. Future revisions of the operating system may provide the same packets with modified sizes in order to accommodate enhancements to the individual packet definitions.

DWORD Reserved

This field is undefined in Chicago, applications should not rely on any particular value being present in this field. (Note (not for SDK/DDK inclusion): Cairo will probably use this field to extend the packet definitions without blowing up apps which rely on the Chicago version.)

DWORD DeviceType (As listed in the table below)

| Device Type ordinal: | Device Type: |
| --- | --- |
| 0x00000000: | OEM/IHV defined device type |
| 0x00000001: | RESERVED (Actually contains the Devnode numbers just marks as reserved in SDK/DDK) |
| 0x0000002: | Logical volumes |

-continued

| Device Type ordinal: | Device Type: |
| --- | --- |
| 0x0000003: | Port device (serial or parallel) |
| 0x0000004: | Network adapter |

If DeviceType is 0, there are two additional fields:

DWORD1-4 OemIdentifier Developers should use the UUIDGEN program to generate a 16 byteGlobally Unique ID for use as an identifier.

DWORD OemSuppFunc Describes the OEM-specific device ID.

Device Specific Packet Data:

The data which follows the packet header is device specific.

Devnode Numbers (Reserved, do not document in SDK/DDK)

DWORD DevnodeNumber This packet type facilitates the removal of the previously defined DBT_DevAdd, DevStart, DevStop, DevRemove, DevQueryRemove, DevQueryRemoveFailed, DevQueryStop, and DevQueryStopFailed messages.

Logical Volumes

DWORD LogicalDriveLetter Bitflags, where the event will affect all volumes with a value of 1. LSB=Drive A. MSB=logical volume 32.

DWORD VolFlags

Bit 0: 0 if event refers to the physical device/drive. 1 if message refers to removable media in the device.

Bit 1-31 Reserved

Note that even though multiple volumes may be covered by a single message due to the LogicalDriveLetter bitmapped filed, this does not guarantee that only a single Logical Volume-related message will arrive. Multiple system components may independently generate events for logical volumes at the same time, thus generating multiple messages.

Modems, Printers, and Port Devices (Serial or Parallel)

STR PortDeviceName String with friendly name of port device, i.e.

"COM1", "Hayes 2400 Smartmodem", "LPT1"

Network adapter

Redirectors will use packet types 2 and 4, and other network services will use type 4 only. Type 2 broadcasts relate to logical volumes as described above, while Type 4 broadcasts provide more direct information about net connections for files and named pipes over UNC connections.

For type 0×4 broadcasts, the following data is included in the buffer immediately after the header:

```
struct_DEV_BROADCAST_NETWORK_ADAPTER {
    DWORD    ulResourceID;
};
```

The ulResourceID is a token that identifies the network connection. Upon receipt of this broadcast, a module can compare the resource ID in the message with the ones it has obtained previously from calls to the new API GetResourceID described below.

GetResourceID

An application that wants to be PnP aware should call the GetResourceID API (below) after opening a file or pipe in order to get the network's resource ID. Then, if the application should receive a WM_DEVICECHANGE indicating that a net may be going or has gone down, it can quickly determine if its files or pipes were affected.

In the case where the message has a wParam of DBT_DEVQUERYREMOVE, the application may have the opportunity to query the user as to whether the disappearance of the device is acceptable.

The API GetResourceID allows an application to determine if a given file or pipe depends upon network's presence.

```
DWORD GetResourceID (
    USHORT          hNetHandle);
```

Parameters hNetHandle A file handle for an open file or pipe.

Returns

The resource ID for the network that the file handle depends upon, or 0 if none.

THE FOLLOWING DISCUSSES APPLICATION TIME "APPY TIME" PROCESSING

Application Time "Appy Time" Processing

A dynamic hardware event can cause many configuration changes. For example, if the user inserts a PCMCIA card that is a SCSI interface, then I/O, IRQ, and DMA resources need to be allocated, drivers need to be allocated, drivers need to be loaded, and the SCSI drives need to be enumerated.

Although the event that starts this process is triggered by a hardware interrupt to the PCMCIA socket driver, the remainder of the processing needs to take place when the file system can be accessed, memory can be allocated, and so on. The Windows 95 SHELL VxD has implemented a set of services that allow this processing to be deferred, to a point termed "application time."

Code that runs at application time is essentially a subroutine executed on behalf of a Windows application. At application time, code can be unlocked, memory can be allocated, and any call that an application can make is also valid for a VxD.

All Configuration Manager events are processed at application time. When an enumerator detects the addition of hardware to the system, it calls CONFIGMG_Reenumerate_DevNode (DEVNODE_TO_BE_ENUMERATED, 0) which causes Configuration Manager to wait until application time and then call the enumerator back.

Run-Time Dynamic Device Loading

Plug and Play permits devices to be loaded dynamically after the system is already running. The following list shows how this process occurs:

CONFIGMG_Get_Next_Res_Des will not reveal this resource descriptor unless the loop is started after the resource descriptor has been added.

The logical configuration being modified must be either BASIC_LOG_CONF or FILTERED_LOG_CONF. Typically, BASIC_LOG_CONF is added to during device driver initialization or enumeration, whereas FILTERED_LOG_CONF is added to during a CONFIG_FILTER device-driver configuration function.

ToDo

For more information about device driver configuration functions, see CandE_Funcs.

See Also

CONFIG_Free_Res_Des

CONFIGMG_Call_At_Appy_Time

CONFIGMG will call back the handler at appy time.

CONFIGRET

CONFIGMG_Call_At_Appy_Time
(CMCALLBACKHANDLER Handler, ULONG ulRefData, ULONG ulFlags)

Return Value

Returns CR_SUCCESS if the function is successful. Otherwise, the return value can be CR_INVALID_FLAG.

Parameters

Handler is the function to be called at appy time.

ulRefData is the parameter to the function to be called back at appy time.

ulFlags must be zero.

Comments

This function is functionally equivalent to SHELL_CallAtAppyTime, but allow CONFIGMG to know that it is appy time.

This function is asynchronous (that is, callable at interrupt time), re-entrant, and fast.

CONFIG_Call_Enumerator_Function

Call the enumerator function about a child devnode.

CONFIGRET CONFIGMG_Call_Enumerator_Function
(DEVNODE dnDevNode, ENUMFUNC efFunc, ULONG ulRefData, PFARVOID pBuffer, ULONG ulBufferSize, ULONG ulFlags)

Return Value

Returns CR_SUCCESS if the function is successful. Otherwise, the return value can be CR_INVALID_DEVNODE, CR_INVALID_POINTER, CR_INVALID_FLAG or CR_INVALID_API. Furthermore, the enumerator may return the result CR_FAILURE.

THE FOLLOWING DISCUSSES "APPY TIME" EVENTS

Virtual Shell Device

About the Shell

The virtual shell device (SHELL) provides services that virtual devices use to display messages, resolve contention between devices, post Window messages to applications and VxDs, monitor changes to virtual machine properties, and carry out two-way communication with Windows-based applications or DLLs. This chapter describes the interfaces of the virtual shell device.

Application Time Events

Application time (also known as 'Appytime, a play on the words "Happy" and "Application") occurs when the system VM runs in the context of an application. At application time, VxDs can perform any operations that Windowsbased applications can. For example, a VxD can load DLLs, link to exported functions, and call the functions.

The system does not automatically notify VxDs when application time occurs. To receive notification, you must use the _SHELL_CallAtAppyTime service to install a callback procedure. The system calls this procedure once and only once when application time next occurs. An arbitrary amount of time may elapse between the call to _SHELL_CallAtAppyTime and a call to the callback procedure. The system does not dispatch application time events while the critical section is held or while the system VM is blocked on any semaphores. There are no guarantees as to the order in which application time events are dispatched.

There are periods of time during which application time is not available, such as during system initialization and system shutdown. Application time may also be momentarily unavailable during the normal operation of the system. You can determine whether application time is available by using the _SHELL_QueryAppyTimeAvailable service. A zero return value means that application time events are not currently available. Even if application time is not available, you can still call _SHELL_CALLAtAppyTime. In such cases, the system places the requested event on a queue and does not dispatch the event until application time becomes available. Application time never becomes available if system shutdown is in progress.

Although application time is not available during system initialization, you can still use _SHELL_CallAtAppyTime to request notification as soon as application time is available. This is especially useful for VxDs that need to carry out tasks while the graphical shell starts. For example, an accessibility VxD may use the WinExec function during application time to start a screen reader or magnifying glass application. This is important for users who would otherwise find the standard network logon dialog box inaccessible. (The system displays the network logon dialog box before it processes the Startup folder, so placing an accessibility application in the Startup folder does not solve the problem.)

You can cancel an application time event that has not yet been dispatched by using the _SHELL_CancelAppyTimeEvent service. The service requires either the handle of the event as returned by _SHELL_CallAtAppyTime or zero. Attempting to cancel a dispatched event can crash the system. To prevent crashes, most VxDs set the event handle to zero after processing the event. _SHELL_CancelAppyTime Event ignores calls in which the handle is zero.

When an application time event is dispatched, the following services are available:
_SHELL_CallDll
_SHELL_FreeLibrary
_SHELL_GetProcAddress
_SHELL_LoadLibrary
_SHELL_LocalAllocEx
_SHELL_LocalFree These services are similar to the Windows functions having corresponding names. For example, the _SHELL_LoadLibrary service loads the given DLL and returns an instance handle that can be used to dynamically link to exported functions.

Two-way Communication

Two-way communication occurs when a VxD receives information from and sends information to a Windows application. Applications can send information to a VxD by calling the protected-mode API procedure for the VxD. Use Get Device Entry Point Address (Interrupt 2Fh Function 1684h) to retrieve the address of this procedure.

A VxD can send information to an application by using a variety of shell services. For example, a VxD can use the services associated with appy time events, such as _SHELL_CallDll, to call a DLL and pass it data. A VxD can also use services such as _SHELL_BroadcastSystemMessage and _SHELL_PostMessage, to post messages to the queues of one or more Windows-based applications.

The _SHELL_BroadcastSystemMessage service is a convenient way to send a window message to a list of recipient windows. A VxD can also intercept these broadcast messages by installing a callback procedure using the _SHELL_HookSystemBroadcast service. The system calls the procedure whenever the _SHELL_BroadcastSystemMessage is called. The _SHELL_UnhookSystemBroadcast service removes the callback procedure.

The _SHELL_PostMessage service calls the Windows PostMessage function. If a VxD calls the _SHELL_PostMessage service when the current VM is not the system VM, the system schedules the message and does not actually post the message until the system VM receives CPU time. If the current VM is the system VM, the system calls the PostMessage function immediately.

When the call to PostMessage is actually made, the system notifies the VxD of the message result by calling a callback procedure specified by the VxD when it called _SHELL_PostMessage. The VxD must be prepared for failure at two points: Immediate failure returned by _SHELL_PostMessage and eventual failure passed to the callback procedure.

If the current VM is the system VM, the system calls the callback procedure before _SHELL_PostMessage returns. To prevent this, use the SPM_UM_AlwaysSchedule value in the uMsg parameter.

Do not make multiple, successive calls to _SHELL_PostMessage. This can fill up the message queue of the window and exhaust available memory.

Do not block the system VM while waiting for the PostMessage function callback. This will deadlock the system.

VM Properties

You can use the SHELL_Hook_Properties service to install a callback procedure to monitor changes the user makes to VM properties. The SHELL_Unhook_Properties service removes the callback procedure when you no longer need to monitor changes.

Miscellaneous

The miscellaneous services let you carry out tasks such as starting applications and checking for user activity. There are the following miscellaneous services:
_SHELL_WinExec
SHELL_Update_User_Activity Shell Service API The shell services API let applications use the shell VxD to carry our useful tasks, such as enumerating the property groups associated with a given virtual machine. For more information, see the topic Shell Service API in the reference section of this chapter.

SHELL_SYSMODAL_Message

```
include shell.inc
mov ebx, Handle          ; virtual machine handle
mov eax, Flags           ; message box flags
mov ecx, OFFSET32 Message ; address of message
mov edi, OFFSET32 Caption ; address of caption
VxDcall SHELL_SYSMODAL Message
mov [Response], eax      ; response code from message box
```

Displays a system modal message box in the Windows shell. Uses EAX and Flags.

Returns the response code from the message box in the EAX register. A response code can be on of the ID symbols defined in the SHELL.INC file.

Handle

Specifies the handle of the virtual machine responsible for the message.

Flags

Specifies the message box flags. See the MB_symbols in the SHELL.INC file. The MB_SYSTEMMODAL value must be given.

Message

Address of a null-terminated string specifying the message text.

Caption

Addresses of a null-terminated string specifying the caption text. If this parameter is zero, the service uses the standard caption. If this parameter points to an empty string, the message box has no caption.

The strings pointed to by the ECX and EDI registers must remain valid until SHELL_Sysmodal_Message returns.

Application Time Events
\_SHELL\_CallAtAppyTime
include shell.inc.

```
VxDCall_SHELL_CallAtAppyTime, <<OFFSET32 pfnCallback>, \
    dwRefData>
cmp eax, 0
je error
mov [EventHandle], eax    ; application time event handle
```

Installs a callback procedure for an application time event. Uses C calling conventions.

Returns the handle of the application time event in the EAX register if successful. Otherwise, returns zero indicating insufficient memory.

pfnCallback

Addresses of the callback procedure to be called when the system VM reaches the application time state. For more information about the procedure, see the comments below:

dwRefData

Reference data to pass to the callback procedure.

This is an asynchronous service.

The system calls the callback procedure whenever the system VM is in a quiet state. The system calls the procedure using the C calling conventions as follows:

cCall [pfnCallback], <dwRefData>

The dwRefData parameter is the same value passed to the \_SHELL\_CallAtAppyTime service. No return value is required.

If application time is not currently available, the event is scheduled for a time when application time is available. If application time never becomes available (for example, if the application time event is scheduled while the system is shutting down), the event is never dispatched.

\_SHELL\_CallDll
include shell.inc
VxDCall\_Shell\_CallDll, <<OFFSET32 lpszDll>, \
<OFFSET32 lpszProcName>, cbArgs, <OFFSET32 lpvArgs>>
mov [ReturnValue], eax Loads the given library, creates a dynamic link to the given function, thunks the function arguments, and calls the function at ring 3. After return from the function this service frees the library.

Returns the value returned from the function if successful. Otherwise, returns zero to indicate an error, such as unable to link to function. If the service can not load the given library, it returns a value range 0 through 31 to indicate the error.

lpszDll

Address of a null-terminated string specifying the file-name of the DLL to load.

lpszProcName

Address of a null-terminated string specifying the name of the function to call, or the ordinal of the function to call. The ordinal must be in the low 16 bits; the high 16-bits must be zero.

cbArgs

Number of bytes of arguments to pass.

lpvArgs

Address of buffer that contains the function arguments. The arguments must be placed in the buffer in the same order as they are pushed on the ring 3 stack. This order depends on whether the function being called uses PASCAL or C calling conventions. The size, in bytes, of each argument must be as required by the function being called.

This service is intended to be called during application time only.

There is no way to distinguish between a DLL function that happened to return a value in the range 0 through 31 from the inability to load the DLL. If such fine control is necessary, use the \_SHELL\_LoadLibrary, \_SHELL\_GetProcAddress, and \_SHELL\_FreeLibrary services.

\_SHELL\_CallDllOld

This service is obsolete: do not use

See the \_SHELL\_CallDll service

\_SHELL\_CancelAppyTimeEvent include shell.inc

VxDCall\_SHELL\_CancelAppyTimeEvent, <EventHandle>

Cancels subsequent calls to the callback procedure associated with the given application time event handle. Uses C calling conventions.

No return value

EventHandle

Handle of the application time event to cancel. The handle must have been previously returned by the \_SHELL\_CallAtAppyTime service.

This is not an asynchronous service.

For convenience, zero is a valid parameter value, in which case the service does nothing and returns immediately.

SHELL\_FreeLibrary
include shell.inc
VxDCall SHELL\_FreeLibrary, <Handle>

Frees the given library, removing it from memory if the reference count decrements to zero. This service is a thunk for the FreeLibrary function. Use C calling conventions.

No return value.

Handle

Instance handle returned from a previous call to the SHELL\_LoadLibrary service.

This service is intended to be called during application time only.

\_SHELL\_GetProcAddress
include shell.inc
VxDCall SHELL\_GetProcAddress, <Handle, <OFFSET32 lpszProcName>> mov [procAddress], eax Retrieves the address of a function exported by the given library. Uses C calling conventions.

Returns the 16:16 address of the function if successful. Otherwise, returns zero.

Handle

Instance handle returned from a previous call to the SHELL\_LoadLibrary service.

lpszProcName

Address of a null-terminated string specifying the name of the function or the ordinal for the function. If an ordinal is given, the ordinal must be in the low 16 bits; the high 16 bits must be zero. This service is intended to be called during application time only.

\_SHELL\_LoadLibrary
include shell.inc
VxDCall SHELL\_LoadLibrary, <<OFFSET32 lpszDll>
mov [Handle], eax Loads the given library. This service is a thunk for the LoadLibrary function. Use C calling conventions.

Returns a handle to instance of library if successful. Otherwise, returns an error value in the range of 0 through 31. These are the same error values as for the Load Library function.

lpszDll

Address of a null-terminated string specifying the file-name of the DLL to load. This service is intended to be called during application time only.

\_SHELL\_LocalAllocEx include shell.inc
VxDCall SHELL_LocalAllocEx, <fl, cb, <OFFSET32 lpvBuf>>
mov [Handle], eax
mov [LinearAddress], edx Allocates memory from the local heap of the message server application.
Uses C calling conventions.

Returns the 16:16 address of the allocated block in the EAX register and a 32-bit linear address in the EDX register if successful. Otherwise, returns zero in both EAX and EDX.

fl
  Flags. Can be a combination of these values:
  LMEM_ZEROINIT Fill block with zeroes.
  LMEM_FIXED Allocate non-movable memory.
  LPTR Same as LMEM_ZEROINIT and LMEM_FIXED.
  LMEM_STRING Allocate a block having the same size in bytes as a null-terminated string. The cb parameter must be zero and lpvBuf must be the address of the null-terminated string.
  Do not use LMEM_MOVEABLE or LMEM_DISCARDABLE.
cb
  Size of block to allocate, in bytes.
lpvBuf
  Address of buffer containing initialization data or NULL if no initialization is needed. The contents of this buffer will be copied into ring 3.

This service is intended to be called during application time only.

The message server application runs without a window on the Windows desktop. VxDs should be frugal with the use of this memory since it is a limited resource. Because Windows moves segments, the 32-bit linear address returned in EDX becomes invalid as soon as control is given to the Windows memory manager. The 16:16 pointer remains valid however.

_SHELL_LocalFree
include shell.inc
VxDCall SHELL_LocalFree, <Handle>

Frees the memory that was allocated by SHELL_LocalAllocEx. Uses C calling conventions.

No return value
Handle
  Handle of block of memory previously allocated by the SHELL_LocalAllocEx service. The handle must be the value previously returned in the EAX register by _SHELL_LocalAllocEx.

This service is intended to be called during application time only.

_SHELL_QueryAppyTimeAvailable
include shell.inc
VxDCall_SHELL_QueryAppyTimeAvailable
or eax, eax
jz not_available Specifies whether application time events are available to VxDs. Application time events are available only after Windows initializes; they cease to be available when Windows begins to shutdown or if the message server GP faults.
Uses C calling conventions.

Returns nonzero in the EAX register if application time events are available.
  Otherwise, returns zero.
  This is an asynchronous service.

This service does not specify whether the system is currently in an appytime state. The message server may GP fault if a call to the CallRing3 service by a VxD GP faults.

Two-way Communication
_SHELL_BroadcastSystemMessage
include shell.inc
VxDCall SHELL_BroadcastSystemMessage, <dwFlags, \
<OFFSET32 lpdwRecipients>, uMsg, wParam, lParam>
mov [Result], eax; 1 if success, 0 if some recipients failed; broadcast, −1 if broadcast failed Broadcasts a message to a specified list of top-level windows and devices. This is a ring 0 version of the Windows BroadcastSystemMessage function. Use C calling conventions.

Returns one of these values in the EAX register:
    0 At least one recipient returned FALSE from the broadcast message.
    1 All components returned TRUE from the broadcast message.
    −1 The message could not be broadcast. Indicates an error, such as unable to allocate a selector alias for the lParam buffer or the broadcast was attempted at an inappropriate time.

dwFlags
  Flags identify the kind of broadcast to perform
lpdwRecipients
  Address of an array of handles identifying the recipients of the broadcast message.
uMsg
  Message number. The high 16 bits must be zero.
wParam
  16-bit message parameter in the low 16 bits. The high 16 bits must be zero
lParam
  32-bit message parameter.

If Windows is active, the SHELL_BroadcastSystemMessage service can be called only during an application time event. Windows is active if application time is available: use the SHELL_QueryAppyTimeAvailable service to determine whether application time is available. If Windows is not active, SHELL_BroadcastSystemMessage sends the broadcast message only to VxDs. Attempting to broadcast a system message at an inappropriate time may result in unpredictable behavior on the part of the system.

_SHELL_HookSystemBroadcast
include shell.inc
VxDCall SHELL_HookSystemBroadcast, <<OFFSET32 pfnHandler>,\
dwRef, dwCallOrder>
mov [Handle], eax; handle of broadcast callback procedure Installs a callback procedure into the broadcast notification chain. The chain monitors calls to the _SHELL_BroadcastSystemMessage service and to the Windows BroadcastSystemMessage function. Uses C calling conventions.

Returns the handle of the installed callback procedure in the EAX register if successful. Otherwise, returns zero.
pfnHandler
  Address of the callback procedure. For more information about the procedure, see the comments below.
dwRef
  Reference data for the callback procedure.
dwCallOrder
  Call order. Must be zero. If more than one callback procedure is installed to monitor the broadcast service, the call order specifies the order in which the given callback procedure is called relative to the other callback procedures. Procedures with equal call order are called in an unspecified (but consistent) order.

The system calls the callback procedure whenever a VxD calls the _SHELL_BroadcastSystemMessage service. The system calls the procedure using the C calling conventions as follows:

VxDCall [pfnHandler], uMsg, wParam, lParam, dwRef>

The uMsg parameter is the message number and wParam is the 16-bit message parameter. For both uMsg and wParam, the low 16 bits contain the parameter value and the high 16 bits are reserved. The lParam parameter is the 32-bit message parameter and dwRef is the same reference data value passed to _SHELL_HookSystemBroadcast.

The return value from the callback procedure is ignored if the broadcast is not a BSF_QUERY. Otherwise, the procedure should return a nonzero value to allow the broadcast to continue, or zero to fail the message and halt the broadcast. The procedure should return 1 for any messages it does not understand.

If the callback procedure is installed while a broadcast in progress, it is unspecified whether the hook will receive that broadcast. It will, regardless, receive all subsequent broadcasts.

_SHELL_PostMessage
include shell.inc
VxDCall_SHELL_PostMessage, <hwnd, uMsg, wParam, lParam, \
<OFFSET32 pfnCallback>, dwRefData>
or eax, eax
jn not_posted Schedules a message for posting to the given window and optionally installs a callback procedure to be notified when the PostMessage function actually posts the message. Uses C calling conventions.

Returns nonzero in the EAX register if successful. Otherwise, returns zero indicating an error such as insufficient memory.

hwnd
Handle of a window. The upper 16 bits are reserved and must be zero.

uMsg
Message value in the lower 16-bits. The upper 16 bits contain scheduling information and can be one of these values:
SPM_UM_DoNotWaitForCrit Do not wait for the critical section to become free before posting the message.
SPM_UM_AlwaysSchedule Always schedule the post-message event. See comments below.
If WM_NULL(0) is given in the lower 16 bits, the service does not post a message but does call the callback procedure indicating success.

wParam
16-bit message parameter in the lower 16-bits. The upper 16 bits are reserved and must be zero.

lParam
32-bit message parameter.

pfnCallback
Address of the callback procedure to call when the message has been posted. This parameter can be zero if no callback is needed. For more information about the procedure, see the comments below.

dwRefData
Reference data for the callback procedure.

The system calls the callback procedure when the PostMessage function successfully posts the message into the queue of the given window. The system calls the procedure using the C calling conventions as follows.

cCall [pfnCallback], <dwRc, dwRefdata>

The dwRefData parameter is the same value as passed to _SHELL_PostMessage. The dwRc parameter is the value returned by the PostMessage function. If this parameter is nonzero, the message was posted; otherwise, it was not posted.

When the callback procedure receives control, the system VM has been boosted by High_Pri_Device_Boost.

_SHELL_PostShellMessage
include shell.inc
VxDCall_SHELL_PostShellMessage, <wParam, lParam>

Posts a message to the current shell window. Uses C calling conventions.

No return value.

wParam
Lower 16 bits contain wParam. Upper 16 bits are reserved and must be zero.

lParam
32-bit lParam.

Do not make multiple, successive calls to _SHELL_PostShellMessage. This can fill up the message queue of the window and exhaust available memory.

_SHELL_UnhookSystemBroadcast
include shell.inc
VxDCall SHELL_UnhookSystemBroadcast, <Handle>

Removes a callback procedure from the broadcast notification chain. Uses C calling conventions.

No return value

Handle
Handle of callback procedure to remove. This handle must have been previously returned by the _SHELL_HookSystemBroadcast service. For convenience, zero is a valid parameter value, in which case the service does nothing and returns immediately.

VM Properties
SHELL_Hook_Properties
mov eax, GroupID; property group identifier
mov edx, OFFSET32 DLLName; address of property group DLL
mov esi, OFFSET32 Callback; address of callback procedure
VxDCall SHELL_Hook_Properties
jc error Installs a callback procedure that monitors changes to the properties of virtual machines. The GroupID parameter identifies what group of property data the procedure is associated with. The system calls the procedure simply to notify it of changes the user has made to properties associated with a new or existing VM. This means the procedure can examine the property data but cannot make changes. Uses EAX, ECX, EDX, and Flags.

Clears the carry flag if successful. Otherwise, sets the carry flag to indicate an error, such as invalid property identifier or insufficient memory.

GroupId
Property group identifier. Can be either a valid group ordinal, such as GROUP_TASK (as defined in PIF.H), or the address of a null-terminated string specifying the name of a custom PIF group. The string must not be longer than PIFEXTSIGSIZE (16) characters, including the terminating null character.

DllName
Address of a null-terminated string specifying the name of the property group DLL. This parameter can be NULL if no DLL exists.

Callback
Address of the callback procedure. For more information about the procedure, see comments below.

If addresses are given for the GroupID and DLLName parameters, the addresses must remain valid for the duration of system operation.

The system calls the callback procedure immediately after Create_VM processing and whenever the properties for existing VM are changed. The system calls the procedure as follows:

mov ebx, Handle; virtual machine handle
    mov edx, OFFSET32 Data; address of property data
    mov edi, OFFSET32 Ordinal; address of property ordinal
    call [Callback]

The Handle parameter is the handle of the virtual machine being changed. The Data parameter is the address of the property data associated with the virtual machine. The Ordinal parameter is the address of a 32-bit variable that contains the property ordinal. If the property ordinal is zero, the variable is immediately followed by a null-terminated string specifying the name of the property group. No name is given if the ordinal is not zero. The callback requires no return value.

SHELL_Unhook_Properties
include shell.inc mov eax, GroupID; property group identifier
    mov esi, OFFSET32 Callback; address of callback procedure
    VxDCall SHELL_Unhook_Properties
    jc error Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

```
; *********************************************************************
;
;   _SHELL_CallAtAppyTime
;
;   int _cdecl
;        SHELL_CallAtAppyTime(pfnCallback, dwRefData, flAppy, . . . /* cms */)
;
;        pfnCallback    ->    Callback function at Appy time
;
;        dwRefData      =     Reference data for callback
;
;        flAppy         =     Flags to control event scheduling
;
;             CAAFL_RINGO = Call between system control messages, too
;
;                  If this bit is set, then the criteria for dispatching
;                  the event changes to "Simulation of int 21h is safe."
;                  In such case, the event will also be dispatched under
;                  the following conditions:
;
;                       The system is between VxDs when sending the Device_Init,
;                       Init_Complete, and Sys_VM_Init messages.
;
;                  Note that this means that an event scheduled with
;                  the CAAFL_RINGO bit cannot use any of the SHELL services
;                  that thunk to Windows APIs because it may have been
;                  dispatched during one of these special circumstances.
;
;             CAAFL_TIMEOUT = Abandon the event after a timeout
;
;                  If this bit is set, then the optional cms value is
;                  a timeout in milliseconds. If the 'Appy-time event
;                  does not occur within the specified amount of time,
;                  the callback will be called with the CAAFL_TIMEOUT
;                  bit set. (See below.)
;
;
;             All other bits are reserved and must be zero.
;
;        cms            =     Optional timeout value
;
;   RETURNS
;
;        EAX = handle to Appy-time event
;
;        EAX = 0 on failure, callback will not be made
;
;             Reasons for failure include . . .
;                  Insufficient memory
;                  Windows initialization not yet complete
;
;   USES
;        C standard
;
```

```
;       CALLBACK
;
;       int __cdecl
;           SHELL__AppyCallback (dwRefData, fl)
;
;           dwRefData   =   Reference data as passed to __SHELL__CallAtAppyTime
;
;           fl          =   Flags
;
;                           CAAFL__TIMEOUT is set if the event timed out.
;
;                           All other bits are reserved and should be ignored.
;
;
;       REMARKS
;
;       This is an async service.
;
;       The 'Appy-time event will be called when the System VM is in a
;       quiet state. During 'Appy-time, it is safe to reflect into the
;       System VM any interrupts or calls that can be performed by
;       a Windows application.
;
;       An arbitrary amount of time may elapse between the call to
;       SHELL__CallAtAppyTime and the dispatching of the event.
;       In particular, the critical section must be free and the system
;       VM must not be blocked on any semaphores before an 'Appy-time
;       state can be entered.
;
;       Unlike other scheduled events, 'Appy-time events are guaranteed
;       to be dispatched in the order they are scheduled.
;
;===============================================================================
;*******************************************************************************
;
;       __SHELL__CancelAppyTimeEvent
;
;       void __cdecl
;           SHELL__CancelAppyTimeEvent (hate)
;
;           hate = Handle to 'Appy-Time Event
;               (as obtained from __SHELL__CallAtAppyTime)
;               0 is a valid argument, it causes nothing to be cancelled
;
;       EXIT:
;           'Appy-time event has been cancelled.
;
;       USES:
;           C standard
;
;       REMARKS
;
;       This is *not* an async service.
;
;===============================================================================
;*******************************************************************************
;
;       __SHELL__BroadcastSystemMessage
;
;       Broadcasts a message to all top-level windows and devices. This
;       is a Ring 0 version of the BroadcastSystemMessage API, q.v.
;
;       Additional constraints on the Ring 0 version:
;
;           Between the time the Windows GUI has been initialized and it
;           has shut down, calls to SHELL__BroadcastSystemMessage must be
;           restricted to 'Appy-time. A VxD can determine whether
;           Windows is active by calling the SHELL__QueryAppyTimeAvailable
;           service.
;
;           If the Windows GUI has not yet been initialized, or if it has
;           already shut down, then SHELL__BroadcastSystemMessage will
;           broadcast only to VxDs.
;
;           Attempting to broadcast a system message at an inappropriate
;           time may result in unpredictable behavior on the part of the
;           system.
;
;
;       int __cdecl
```

```
;        SHELL_BroadcastSystemMessage(
;                        DWORD dwFlags,
;                        DWORD *lpdwRecipients,
;                        DWORD uMsg, DWORD wparam, DWORD lparam)
;
;       dwFlags = flags describing what kind of broadcast to perform
;       lpdwRecipients = where to broadcast
;       uMsg = message number (HIWORD must be zero)
;       wparam = Windows wParam for message (HIWORD must be zero)
;       lparam = Windows lParam for message
;
; RETURNS
;
;       EAX = 0    if some component failed the broadcast
;
;       EAX = 1    if all components accepted the broadcast
;
;       EAX = -1   if the message could not be broadcast
;                  Reasons include (but are not restricted to):
;                       Unable to allocate a selector alias for the lparam buffer.
;                       Broadcast attempted at inappropriate time.
;
; USES
;       C standard
;
;=====================================================================
;*********************************************************************
;
; _SHELL_HookSystemBroadcast
;
; Installs a procedure to be called whenever a _SHELL_BroadcastSystemMessage
; is performed. The functions installed are called in order of their
; hook call order. Functions with the same hook call order are called
; in an unspecified (but consistent) order.
;
; int _cdecl
;       SHELL_HookSystemBroadcast (DWORD pfnHandler,
;                       DWORD dwRef, DWORD dwCallOrder)
;
;       pfnHandler    =   procedure to call
;       dwRef         =   reference data for callback
;       dwCallOrder   =   Hook call order (must be zero)
;
; RETURNS
;
;       EAX  =  handle to broadcast node on success
;            =  0 on failure to install
;
; USES
;       C standard
;
; CALLBACK
;
; int _cdecl
;       SHELL_BroadcastCallback(
;               DWORD uMsg, DWORD wparam, DWORD lparam, DWORD dwRef)
;
;       uMsg = message number (HIWORD is reserved for future use)
;       wparam = Windows wParam for message (HIWORD is reserved for future use)
;       lparam = Windows lParam for message
;       dwRef = reference data passed to _SHELL_HookSystemBroadcast
;
; The return value from the callback is ignored if the broadcast is
; not a BSF_QUERY. Otherwise, the callback should return a nonzero
; value to allow the broadcast to continue, or zero to fail the message
; and halt the broadcast.
;
; The callback should return 1 for any messages it does not understand.
;
; REMARKS:
;
;       If the hook is installed while a broadcast in in progress,
;       it is unspecified whether the hook will receive that broadcast.
;       It will, regardless, receive all subsequent broadcasts.
;
;=====================================================================
;*********************************************************************
;
; _SHELL_UnhookSystemBroadcast
;
```

```
;   Removes a procedure from the broadcast notification chain.
;
;   int _cdecl
;       SHELL_UnhookSystemBroadcast (DWORD hbh)
;
;       hbh = Handle of broadcast hook as returned from
;               _SHELL_HookSystemBroadcast.
;               0 is a valid argument; it causes nothing to be unhooked.
;
;   RETURNS
;
;       None.
;
;   USES
;       C standard
;
;   REMARKS
;
;       A broadcast hook can be unhooked while it is being serviced.
;       In which case, it will receive no further broadcasts, not
;       even broadcasts triggered by the hook itself before returning.
;
;====================================================================
;********************************************************************
;
;   _SHELL_LocalAllocEx  // BUGBUG - - Get a better name
;
;   DWORD _cdecl
;       SHELL_LocalAllocEx(DWORD fl, DWORD cb, LPVOID lpvBuf)
;
;       fl = flags
;           The following flags from the Windows SDK are observed.
;
;                   LMEM_ZEROINIT    - - Data will be zero-initialized
;                   LMEM_FIXED       - - Allocate non-moveable memory
;                   LPTR             - - LMEM_ZEROINIT + LMEM_FIXED
;
;           Note that LMEM_MOVEABLE and LMEM_DISCARDABLE are expressly
;           forbidden.
;
;           The following extended flags are also permitted.
;
;                   LMEM_STRING     - - Compute the necessary
;                                       block size based on the length
;                                       of an ASCIIZ string.
;
;                   If the LMEM_STRING flag is set, the cb argument
;                   must be zero, and the lpvBuf pointer must be valid.
;
;       cb = size of block to allocate
;
;       lpvBuf =  flat pointer to initialization buffer, or NULL
;                 if no initialization is needed.
;
;                 The contents of this buffer will be copied into ring 3.
;
;   The memory is allocated from the local heap of the message server
;   application, which is running invisibly on the Windows desktop.
;   VxDs should be frugal with the use of this memory since it is
;   a limited resource.
;
;   Optionally, the ring 3 memory can be initialized from a ring 0 buffer.
;
;   The simplest way to call this function is as
;
;       SHELL_LocalAllocEx(LPTR, cb, NULL)
;
;   which allocates the memory and initializes it with zeros.
;
;   To initialize the memory from a ring 0 buffer, you can call
;
;       SHELL_LocalAllocEx(LPTR, cb, lpvBuf)
;
;   This allocates cb bytes of memory which will be initialized with
;   the first cb bytes of lpvBuf.
;
;   It is frequently the case that a string needs to be copied into
;   ring 3. For convenience, the LMEM_STRING flag has been defined
;   which instructs SHELL_LocalAllocEx to compute the necessary buffer
;   size from the length of an ASCIIZ string.
```

```
;           SHELL_LocalAllocEx(LPTR + LMEM_STRING, 0, lpszFileName)
;
; RETURNS
;       Failure:
;           EAX = EDX = 0 if the memory could not be allocated.
;       Success:
;           EAX = 16:16 pointer to data.
;           EDX = flat pointer to data.
;
; USES
;       C standard
;
; REMARKS
;
; This is an 'Appy-time-only service.
;
; NOTE! Since Windows moves segments, the flat pointer returned
; in EDX becomes invalid as soon as control is given to the Windows
; memory manager. The 16:16 pointer remains valid, however.
;
; If the message server crashes, all its local memory is automatically
; freed, at which point all memory allocated via SHELL_LocalAllocEx
; becomes invalid. If your VxD retains memory for an extended period
; of time, it should also hook the WM_DEVICECHANGE (DBT_APPYEND)
; notification to know that its pointers have become invalidated.
;
;===============================================================
;**************************************************************
;
;       _SHELL_LocalFree
;
;       void _cdecl
;           SHELL_LocalFree(DWORD hData)
;
;           hData = handle to data allocated by SHELL_LocalAllocEx.
;
; This function frees the memory that was allocated by SHELL_LocalAllocEx.
; There is no return value.
;
; USES
;       C standard
;
; REMARKS
;
; This is an 'Appy-time-only service.
;
;===============================================================
;**************************************************************
;
;       _SHELL_LoadLibrary
;
;       HINSTANCE _cdecl
;           SHELL_LoadLibrary(LPCSTR lpszDll)
;
;           lpszDll = flat pointer to ASCIIZ string naming DLL to load.
;
; This is a VxD thunk for the LoadLibrary function in the Windows SDK.
;
; RETURNS
;       EAX =   handle to instance of library, or an integer in the
;               range 0 .. 31 on error (see Windows SDK for details)
;
; USES
;       C standard
;
; REMARKS
;
; This in an 'Appy-time-only service.
;
;===============================================================
;**************************************************************
;
;       _SHELL_FreeLibrary
;
;       void _cdecl
;           SHELL_FreeLibrary(DWORD hinstance)
;
;           hinstance = instance handle returned from SHELL_LoadLibrary
```

```
;   This is a VxD thunk for the FreeLibrary function in the Windows SDK.
;
;   RETURNS
;       None.
;
;   USES
;       C standard
;
;   REMARKS
;
;   This is an 'Appy-time-only service.
;
;===============================================================
;****************************************************************
;
;   _SHELL_GetProcAddress
;
;   DWORD _cdel
;       SHELL_GetProcAddress(DWORD hinstance, LPCSTR lpszProcName)
;
;       hinstance     = instance handle returned from SHELL_LoadLibrary
;       lpszProcName  = flat pointer to ASCIIZ string naming function,
;                       or function ordinal if HIWORD(lpszProcName) = 0.
;
;   RETURNS
;       This function returns the 16:16 address of the procedure, or zero
;       if the procedure could not be located.
;
;   USES
;       C standard
;
;   REMARKS
;
;   This is an 'Appy-time-only service.
;
;===============================================================
;****************************************************************
;
;   _SHELL_ShellExecute
;
;   int _cdecl
;       SHELL_ShellExecute(lpshexPacket)
;
;       lpshexPacket = flat pointer to SHEXPACKET structure (see shell.h)
;
;   RETURNS
;
;       EAX = return value from Windows ShellExecute function.
;
;   REMARKS
;
;   This is an 'Appy-time-only service.
;
;   Note that the SHEXPACKET contains no pointers. All pointer-like values
;   are byte offsets from the start of the packet. For example, the name
;   of the file to be opened is stored at lpshexPacket + ibFile.
;
;   Description of the SHEXPACKET fields:
;
;       dwTotalSize    size of the SHEPACKET plus size of any baggage.
;
;       dwSize         must be equal to sizeof(SHEXPACKET).
;
;       ibOp           Operation to perform.
;
;                          0 to open the file.
;
;                          any other value is a relative offset from
;                          lpshexPacket to an ASCIIZ string naming the
;                          operation to perform.
;
;       ibFile         File on which ibOp is to be performed. This is
;                      a relative offset from lpshexPacket to an ASCIIZ
;                      string naming the file on which to perform.
;
;       ibParams       Optional parameters. If zero, no parameters are
;                      passed. Otherwise, it is a relative offset from
;                      lpshexPacket to an ASCIIZ string.
```

-continued

| | |
|---|---|
| ibDir | Working directory. If zero, the Windows directory will be used as the working directory. Otherwise, it is a relative offset from lpshexPacket to an ASCIIZ string. |
| ibEnv | Environment block to pass to the program. If zero, the master environment will be given to the program. Otherwise, it is a relative offset from lpshexPacket to an environment block. This field is ignored for MS-DOS applications, which will always receive a copy of the master environment. |
| nCmdShow | How the application window is to be shown. See the Windows SDK for valid values. |
| rgchBaggage | Arbitrary additional information you require. Many of the fields in the SHEXPACKET are relative offsets which point into the baggage. |

See the Windows SDK for additional information about the ShellExecute function.

NOTE ABOUT EXAMPLES: The examples assume that the 'offsetof' macro is the version defined by the 1990 ISO C standard (7.1.6), where the first argument is a structure name and the second argument is the field name. You may find that your 'offsetof' macro requires a structure *pointer* as the first argument instead of a structure name. The necessary adjustments to the examples should be obvious.

Example 1:

This example runs the program "worker.exe" with no parameters, with the Windows directory as the working directory, and the default environment. The application will be run hidden. Most uses of SHELL_ShellExecute will probably be this simple.

Observe how the entire size of the packet, including baggage, is passed in the dwTotalSize, while the size of the packet header is passed in dwSize.

```
typedef struct tagMYSHEXPACKET1 {
        SHEXPACKET    shex;
        char          szCommand[11];
} MYSHEXPACKET1;

MYSHEXPACKET1 myshex1 = {
        {
            sizeof (MYSHEXPACKET1),              /* dwTotalSize */
            sizeof (SHEXPACKET),                 /* dwSize */
            SHEXIBOP_WINEXEC,                    /* ibOp */
            offsetof(MYSHEXPACKET1, szCommand),  /* ibFile */
            0,                                   /* ibParams */
            0,                                   /* ibDir */
            0,                                   /* ibEnv */
            SW_HIDE,                             /* nCmdShow */
        },
        "worker.exe",                            /* szDrivePath */
};

SHELL_ShellExecute(&myshex1.shex);
```

Example 2:

This example runs the program "MyProg.Exe" with the parameters "/foo /bar", with C:\WINDOWS as the working directory and an environment consisting of the two variables PATH=C:\WINDOWS
    VAR=value The application will be run maximized.

```
typedef struct tagMYSHEXPACKET2 {
        SHEXPACKET    shex;
        char          szDrivePath[128];
        char          szCommand[1024];
        char          szParams[1024];
        char          szEnv[1024];
} MYSHEXPACKET2;
```

```
;       MYSHEXPACKET2 myshex2 = {
;           {
;               sizeof(MYSHEXPACKET2),                      /* dwTotalSize */
;               sizeof(SHEXPACKET),                         /* dwSize */
;               SHEXIBOP_WINEXEC,                           /* ibOp */
;               offsetof(MYSHEXPACKET, szCommand),          /* ibFile */
;               offsetof(MYSHEXPACKET, BzParams),           /* ibParams */
;               offsetof(MYSHEXPACKET, szDrivePath),        /* ibDir */
;               offsetof(MYSHEXPACKET, szEnv),              /* ibEnv */
;               SW_SHOWMAXIMIZED,                           /* nCmdShow */
;           },
;           "C:\\WINDOWS",                                  /* szDrivePath */
;           "MyProg.Exe",                                   /* szCommand */
;           "/foo /bar",                                    /* szParams */
;           "PATH=C:\\WINDOWS\0VAR=value\0",                /* szEnv */
;       };
;
;       SHELL_ShellExecute(&myshex2.shex);
;
;
;============================================================================
;****************************************************************************
;
;   _SHELL_CallDll
;
;   DWORD SHELL_CallDll   (LPCSTR lpszDll, LPCSTR lpszProcName,
;                          DWORD cbArgs, LPVOID lpvArgs)
;
;
;       lpszDll      =  flat pointer to ASCIIZ string naming DLL to load,
;                       or zero to call a Ring 3 address directly.
;       lpszProcName =  flat pointer to ASCIIZ string naming function,
;                       or function ordinal if HIWORD(lpszProcName) = 0,
;                       or a 16:16 ring 3 address if lpszDll = 0
;       cbArgs       =  number of bytes of arguments to pass
;       lpvArgs      =  pointer to buffer of arguments
;
;   This function is basically a wrapper around all the thunk stuff
;   for your one-stop.thunking needs. It takes care of . . .
;
;       SHELL_LoadLibrary'ing the DLL.
;       SHELL_GetProcAddress'ing the procedure address in the DLL.
;       CallRing3'ing the function with cbArgs and lpvArgs.
;       SHELL_FreeLibrary'ing the DLL's hinstance afterwards.
;
;   If you already have the GetProcAddress, you could in principle
;   call the VMM service _CallRing3 directly. DO NOT DO THIS.
;   If the selector you are trying to call is not present, VMM will
;   GP fault when returning to ring 3, and you will die. Instead,
;   call _SHELL_CallDll passing zero as the lpszDll and the address
;   you want to call as the lpszProcName. This service will do
;   the necessary work to cause the selector to fault in. (If the
;   selector is invalid rather than not present, you will still die.)
;   Neither _CallRing3 nor _SHELL_CallDll will protect against
;   selector-not-present faults in SS or DS.
;
;   Note also that all arguments to the function being called must
;   be passed on the stack. Do not rely on the value of any of
;   the client registers on entry to the function, except of course
;   for SS and DS. The function being called must conform to the
;   C or PASCAL calling convention. It is your job to ensure that
;   the parameters are pushed onto the stack in the proper order.
;   The function being called must preserve the DS, BP, SI and DI
;   registers, as required by the C and PASCAL calling conventions.
;
;   RETURNS
;
;   The return value is the return value from the function, or a small
;   integer in the range 0 . . 31 on error, which is the return value
;   from the failed SHELL_LoadLibrary. If the SHELL_GetProcAddress
;   fails, the return value is zero. If some other error occurs at
;   ring zero, the return value is zero.
;
;   Note that if you pass a DLL name, then a return value in the range
;   0 . . 31 is ambiguous. It could mean that SHELL_LoadLibrary or
;   GetProcAddress or some ring zero component failed, or it could be
;   the actual return code from the function. To avoid this problem,
;   use the lpszDll = 0 form of the call after doing a manual
;   SHELL_LoadLibrary and SHELL_GetProcAddress.
;
;   REMARKS
```

-continued

```
;    This is an 'Appy-time-only service.
;
;    EXAMPLES
;
;    Example 1:        /* Simple example */
;
;        /* PASCAL calling convention passes arguments backwards */
;        struct tagEXITWINDOWARGS {
;            WORD wReserved;
;            DWORD dwReturnCode;
;        } ewa = { 0, EW_REBOOTWINDOWS };
;        SHELL_CallDll("USER", "EXITWINDOWS", sizeof(ewa), &ewa);
;
;    Example 2:        /* Calling by ordinal */
;
;        #define ordWinExec  166
;        /* PASCAL calling convention passes arguments backwards */
;        struct tagWINEXECARGS {
;            WORD nCmdShow;
;            DWORD lpszCmdLine;
;        } wea = { SW_NORMAL, 0 };
;        wea.lpszCmdLine =
;                    SHELL_LocalAllocEx(LPTR + LMEM_STRING, 0, "MyProg.exe");
;        SHELL_CallDll("KERNEL", ordWinExec, sizeof(wea), &wea);
;        SHELL_LocalFree(wea.lpszCmdLine);
;
;    Example 3:        /* Calling by address */
;
;        /*
;         * Calling by address is suggested if you will be calling into your
;         * DLL many times in quick succession, since the normal SHELL_CallDll
;         * will load the library, call the function, then free it. Each
;         * LoadLibrary will load the DLL off the disk anew, which wastes
;         * disk I/O. Instead, SHELL_LoadLibrary it once, do all your calls,
;         * then SHELL_FreeLibrary it when you are done.
;         */
;
;        HINSTANCE hinst;
;        FARPROC lpfnMyFunction;
;
;        struct tagMYFUNCTIONARG {
;            WORD wParam;
;        } mfa = { 0 };
;
;
;        hinst = SHELL_LoadLibrary("MYDLL");
;        if (hinst < 32) return ERROR;
;        lpfnMyFunction = SHELL_GetProcAddress(hinst, "MYFUNCTION");
;        if (lpfnMyFunction == 0) {
;            SHELL_FreeLibrary(hinst); return ERROR;
;        }
;
;        /* Now call MyFunction three times with arg 0, 1, and 2. */
;
;        mfa.wParam = 0;
;        SHELL_CallDll(0, lpfnMyFunction, sizeof(mfa), &mfa);
;
;        mfa.wParam = 1;
;        SHELL_CallDll(0, lpfnMyFunction, sizeof(mfa), &mfa);
;
;        mfa.wParam = 2;
;        SHELL_CallDll(0, lpfnMyFunction, sizeof(mfa), &mfa);
;
;        /* Finished. Free the library. */
;        SHELL_FreeLibrary(hinst);
;
;        return OK;
;
```

We claim:

1. A computer system, comprising:

a microprocessor providing execution of program code at a plurality of privilege rings, the privilege rings including a most privileged ring and a user mode ring;

a message server executing on the microprocessor at the user mode ring;

at least one virtual driver executing on the microprocessor at the most privileged ring; and an operating system component executing on the microprocessor at the most privileged ring and having a plurality of application programming interfaces callable by virtual drivers including an interface for requesting application time processing of an operation, the operating system component being operative responsive to a call to the interface to post an application time request message to the message server, the operating system component having a function adapted to modify the message server's user mode execution state to perform the operation;

the message server being adapted to respond to the application time request message by calling the function in the operating system component adapted to modify the message server's user mode execution state, whereby the operation is performed for the virtual driver by a user mode component.

2. The computer system of claim 1 wherein the operation is a message broadcasting operation.

3. A method for a ring 0 component to invoke a procedure provided in a user mode component, comprising:

posting by the ring 0 component of a message to the user mode component requesting application time processing;

retrieving the posted message by a process thread executing in the user mode component;

calling by the process thread from the user mode component into the ring 0 component;

setting a user mode execution state of the process thread by the ring 0 component to perform the procedure and a return call to the ring 0 component;

performing the procedure by the user mode component;

calling by the user mode component of the ring 0 component; and restoring by the ring 0 component of the user mode execution state of the process thread.

4. The method of claim 3 for further allowing a virtual driver to invoke the procedure provided in the user mode component, comprising:

providing a call back function in the virtual driver;

providing an interface in the ring 0 component for the virtual driver to request application time processing and register the call back function;

calling the interface by the virtual driver;

when the process thread calls into the ring 0 component, calling the call back function of the virtual driver by the ring 0 component; and calling a function of the ring 0 component by the virtual driver to cause the ring 0 component to set the user mode execution state of the process thread to perform the procedure of the user mode component.

5. A computer-readable medium having computer-executable instructions for performing the steps recited in claim 4.

6. A computer-readable medium having computer-executable instructions for performing the steps recited in claim 3.

7. A computer system, comprising:

a microprocessor providing execution of program code at a plurality of privilege rings, the privilege rings including a privileged mode ring and a user mode ring;

a user mode component allocated at the user mode ring of the microprocessor;

a user mode process thread executing on the microprocessor at the user mode ring;

a virtual driver allocated at the privileged mode ring of the microprocessor and having an application time call back function;

a privileged mode component allocated at the privileged mode ring of the microprocessor and having an application time processing request interface for calling by the virtual driver to request application time processing and register the virtual driver's application time call back function for call back; and wherein the privileged mode component posts a message to the user mode component responsive to the virtual driver's interface call to cause the user mode process thread to call into the privileged mode component, the user mode process thread when in the privileged mode component calls the application time call back function of the virtual driver, and the application time call back function causes a user mode execution state of the process thread to be set so as to perform a desired user mode procedure when the process thread returns from the privileged mode component.

8. The computer system of claim 7 wherein the privileged mode component also has a broadcast system message interface for calling by the virtual driver to cause the privileged mode component to set the user mode execution state of the process thread to perform a call to a user mode interface for requesting broadcast of a system message when the process thread returns from the privileged mode component.

9. A method of broadcasting messages to recipient components at a plurality of privilege rings of a protected mode processor, comprising:

issuing, by an application at a user mode privilege ring, a broadcast system message call having a plurality of call parameters comprising a message identifier indicating a desired message out of a set of predefined messages, and a recipient list indicating desired recipient components of the message out of a plurality of classes of components comprising at least applications at the user mode privilege ring and virtual drivers at a more privileged ring;

receiving, by a message server, the broadcast system message call; and sending, by the message server responsive to the broadcast system message call, the indicated message to recipient components of the classes indicated by the recipient list.

10. The method of claim 9 wherein the classes of components from which the recipient list parameter indicates the desired recipient components includes user mode drivers.

11. A computer-readable medium having computer-executable instructions for performing the steps recited in claim 10.

12. The method of claim 9 wherein the call parameters further comprise a parameter for indicating the broadcast message is a query, the method further comprising:

receiving, by the message server, return values from the recipient components indicative of each recipient component's acceptance or non-acceptance of the indicated message; and returning, by the message server, a return value to the application indicative of whether the recipient program components accepted the indicated message.

13. The method of claim 12 further comprising:

ceasing, by the message server, to send the indicated message to the indicated recipient components on receiving a return value from any recipient program component indicative of non-acceptance of the indicated message.

14. A computer-readable medium having computer-executable instructions for performing the steps recited in claim 12.

15. A computer-readable medium having computer-executable instructions for performing the steps recited in claim 13.

16. A computer-readable medium having computer-executable instructions for performing the steps recited in claim 9.

17. In a computer system having application programs executing at a user mode privilege ring and virtual drivers executing at a more privileged ring, a method for a virtual driver to broadcast a system message to a group of recipient components including application programs, the method comprising:

issuing, by the virtual driver, an application time processing request call having a parameter indicative of an application time call back function of the virtual driver;

receiving, by a privileged ring operating system component, the application time processing request call;

posting, by the privileged ring operating system component in response to the application time processing request call, an application time request message to a message server process at the user mode ring;

retrieving, by a process thread of the message server process, the application time request message;

calling, by the process thread in response to the application time request message, into the privileged operating system component;

issuing, by the process thread in the privileged operating system component, a call to the application time call back function of the virtual driver;

issuing, by the process thread in the application time call back function of the virtual driver, a privileged mode broadcast system message call having a plurality of call parameters comprising a message identifier and a recipients list parameter;

receiving, by the privileged operating system component, the privileged mode broadcast system message call;

setting, by the privileged operating system component in response to the privileged mode broadcast system message call, a user mode execution state of the process thread to cause the process thread to issue a call to a broadcast system message interface of the message server according to the call parameters of the privileged mode broadcast system message call upon return to the user mode of execution;

returning, by the process thread, to the user mode of execution from the calls into the privileged operating system component and virtual driver;

whereby the process thread calls the broadcast system message interface of the message server in the user mode privilege ring on behalf of the virtual driver.

18. A computer-readable medium having computer-executable instructions for performing the steps recited in claim 17.

* * * * *

UNITED STATES PATENT AND TRADEMARK OFFICE
CERTIFICATE OF CORRECTION

PATENT NO. : 5,784,615
DATED : July 21, 1998
INVENTOR(S) : Lipe, et. al.

It is certified that error appears in the above-identified patent and that said Letters Patent is hereby corrected as shown below:

| Col./Line | | Should Read |
|---|---|---|
| 3/42 | Del", key | Del" key |
| 14/20 | lpdwRecipientList | lpdwRecipientList |
| 14/23 | lParam | lParam |
| 16/13 | lParam | lParam |
| 18/47 | Hook-system | Hook_system |
| 19/21 | Important notes | Important notes: |
| 20/8 | OemIdentifier | OemIdentifier |
| 20/23 | Logical Volumes | Logical Volumes: |
| 20/38 | Parallel) | Parallel): |
| 20/43 | adapter | adapter: |
| 20/56 | ulResourceld | ulResourceID |
| 21/57 | ToDo | To Do: |
| 21/60 | See Also | See Also: |
| 25/36 | lpszDll | lpszDll |
| 26/24 | shell | shell |
| 45/7 | BzParams | szParams |
| 45/14 | OVAR | OVAR |
| 45/32 | one-stop.thunking | one-stop-thunking |

Signed and Sealed this

Eleventh Day of January, 2000

Attest:

Q. TODD DICKINSON

Attesting Officer

Acting Commissioner of Patents and Trademarks